United States Patent
Dooley et al.

(10) Patent No.: US 12,054,068 B2
(45) Date of Patent: Aug. 6, 2024

(54) ELECTRIC VEHICLE BATTERY NETWORK MANAGEMENT SYSTEM, METHOD AND VEHICLE

(71) Applicant: Janus Electric Pty Ltd, Berkeley Vale (AU)

(72) Inventors: Bevan Dooley, Berkeley Vale (AU); Alexander Forsyth, Berkeley Vale (AU)

(73) Assignee: Janus Electric Pty Ltd, Mosman (AU)

( * ) Notice: Subject to any disclaimer, the term of this patent is extended or adjusted under 35 U.S.C. 154(b) by 0 days.

(21) Appl. No.: 17/638,562

(22) PCT Filed: Aug. 26, 2020

(86) PCT No.: PCT/AU2020/050893
§ 371 (c)(1),
(2) Date: Feb. 25, 2022

(87) PCT Pub. No.: WO2021/035298
PCT Pub. Date: Mar. 4, 2021

(65) Prior Publication Data
US 2022/0305945 A1    Sep. 29, 2022

Related U.S. Application Data

(60) Provisional application No. 62/910,824, filed on Oct. 4, 2019.

(30) Foreign Application Priority Data

Aug. 27, 2019    (AU) ................................ 2019903126

(51) Int. Cl.
*B60L 53/66* (2019.01)
*B60L 50/60* (2019.01)
(Continued)

(52) U.S. Cl.
CPC ............. *B60L 53/665* (2019.02); *B60L 50/66* (2019.02); *B60L 53/65* (2019.02); *B60L 53/67* (2019.02);
(Continued)

(58) Field of Classification Search
CPC ....... B60L 50/60; Y02E 60/10; G06Q 30/018; Y02T 10/70
See application file for complete search history.

(56) References Cited

U.S. PATENT DOCUMENTS 10,183,563 B2    1/2019    Rayner et al.
10,309,871 B2    6/2019    Hagan, Jr.
(Continued)

FOREIGN PATENT DOCUMENTS

CN    108001428 A  *  5/2018    ................ B25F 5/00
JP    2012222945 A     11/2012
(Continued)

OTHER PUBLICATIONS

International Search Report issued for International Patent Application No. PCT/AU2020/050893, dated Nov. 10, 2020 in 6 pages.
(Continued)

*Primary Examiner* — Santosh R Poudel
(74) *Attorney, Agent, or Firm* — Knobbe, Martens, Olson & Bear, LLP

(57) ABSTRACT

A battery network management system (1) for swappable batteries (5) used in vehicles (9), the system (1) comprising: at least one swappable battery (5) to discharge electrical power to drive a vehicle (9); and a charging station (3) to receive the swappable battery (5). The charging station (3) charges the swappable battery (5) based on a first condition that the swappable battery (5) is authenticated by an authentication system (7); and a first code (8) is associated with the swappable battery (5) to attest the swappable battery (5) was charged by the charging station (3) based on the first condition. The at least one swappable battery (5) discharges electrical power to drive a vehicle (9) based on a second condition that: the swappable battery (5) is received in the vehicle (9) that is authenticated by the authentication system (7); and the authentication system (7) authenticates the first code (8).

20 Claims, 12 Drawing Sheets

(51) Int. Cl.
    *B60L 53/65*     (2019.01)
    *B60L 53/67*     (2019.01)
    *B60L 53/68*     (2019.01)
    *B60L 53/80*     (2019.01)

(52) U.S. Cl.
    CPC ............... *B60L 53/68* (2019.02); *B60L 53/80* (2019.02); *B60L 2200/28* (2013.01); *B60L 2200/36* (2013.01); *B60L 2240/72* (2013.01)

(56) References Cited

U.S. PATENT DOCUMENTS

| | | | |
|---|---|---|---|
| 2011/0018679 A1* | 1/2011 | Davis | H02J 50/10 320/155 |
| 2012/0049787 A1* | 3/2012 | Kuroiwa | H02J 7/04 320/106 |
| 2012/0050054 A1* | 3/2012 | Fujiwara | B60L 58/21 340/636.1 |
| 2012/0316671 A1 | 12/2012 | Hammerslag et al. | |
| 2018/0080852 A1* | 3/2018 | Hagan, Jr. | B60D 1/62 |
| 2019/0197608 A1 | 6/2019 | Iwai et al. | |
| 2022/0245234 A1* | 8/2022 | Chen | G06F 21/44 |

FOREIGN PATENT DOCUMENTS

| | | | |
|---|---|---|---|
| JP | 2014125095 A | * 7/2014 | |
| JP | 2014172151 A | * 9/2014 | ................ B60S 5/06 |
| JP | 6564502 B1 | 8/2019 | |
| KR | 1020160050976 A | 5/2016 | |
| TW | 201720007 A | * 6/2017 | |
| WO | 2018/104965 A1 | 6/2018 | |
| WO | WO 2018174232 A1 | 9/2018 | |

OTHER PUBLICATIONS

Written Opinion issued for International Patent Application No. PCT/AU2020/050893, dated Nov. 10, 2020 in 6 pages.

Extended European Search Report issued in European Application No. 20859515.7, dated Feb. 28, 2024, in 17 pages.

* cited by examiner

ELECTRIC VEHICLE BATTERY NETWORK MANAGEMENT SYSTEM, METHOD AND VEHICLE

CROSS-REFERENCE TO RELATED APPLICATIONS

This application is the U.S. National Phase under 35. U.S.C. § 371 of International Application PCT/AU2020/050893, filed Aug. 26, 2020, which claims priority to Australian Patent Application No. 2019903126, filed Aug. 27, 2019 and claims the benefit of U.S. Provisional Application No. 62/910,824, filed Oct. 4, 2019. The disclosures of the above-described applications are hereby incorporated by reference in their entirety.

TECHNICAL FIELD

The present disclosure relates to a battery network management system, an electric vehicle battery, charger, and an electric vehicle.

BACKGROUND

Electric vehicles require an energy source that can include direct electrical lines (such as overhead lines for "trolley buses"), fuel cells, primary (non-rechargeable) batteries, and secondary (rechargeable) batteries. Some known electric vehicles have rechargeable batteries incorporated into the design that, in normal day to day cycles, are not removable from the vehicle. A consequence is that such vehicles have a significant down time during the recharging cycle. This is problematic for fleet vehicles, such as for haulage or public transport, as it reduces utilisation of equipment. Another problem encountered is the amount of energy required to charge a fleet of heavy vehicles for example a fleet of 100 heavy vehicles requiring a charge of 800 kWh will consume 80,000 kWh or 80 MWh. In order to charge a fleet of said heavy vehicles in 8 hours would require a 10 MW electricity feed. Electrical infrastructure of this magnitude is not installed or available at most depots.

An option includes using removable batteries. However, this can be problematic as the manufacturer, operator, or insurer can lose control of how the vehicle, battery and other associated equipment is used. For example, a third party battery may not have the same safety, efficiency, or other qualities or properties designed for the vehicle, battery and charging system. This can result in a dangerous situation if, for example, the third party battery operates hotter, or charges/discharges outside the designed specifications.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

It is desirable to have an improved system for managing a network of batteries, vehicles and chargers. This includes preventing unauthorised use of elements of the system to improve safety and security of the elements in the network.

A battery network management system for swappable batteries used in vehicles, the system comprising: at least one swappable battery to discharge electrical power to drive a vehicle; and a charging station to receive the swappable battery. The charging station charges the swappable battery based on a first condition that the swappable battery is authenticated by an authentication system; and a first code is associated with the swappable battery to attest the swappable battery was charged by the charging station based on the first condition. The at least one swappable battery discharges electrical power to drive a vehicle based on a second condition that: the swappable battery is received in the vehicle that is authenticated by the authentication system; and the authentication system authenticates the first code.

In some examples, the battery network management system may comprise the authentication system with an associated data store, wherein the authentication system stores first evidence of the first code in the data store, and wherein the authentication system authenticates the first code based on the first evidence in the data store.

In further examples of the battery network management system the first evidence is the first code.

In another example, the data store comprises a distributed ledger.

In yet a further example of the battery network management system, the data store comprises a blockchain based distributed ledger.

In some examples, the swappable battery is associated with a battery data store, and wherein a first representation of the first code is stored in the battery data store.

In some examples of the battery network management system, the authentication system authenticates the first code by comparing the first representation stored in the battery data store with the first evidence stored in the data store.

In some examples, to authenticate the swappable battery by the authentication system includes: authenticating identifier(s) associated with the swappable battery, or identifier(s) associated with cells in the battery, against corresponding records, stored in the data store, of identifiers associated with the swappable battery. In further examples, the data store includes a Blockchain based distributed ledger, and the corresponding records of identifiers associated with the swappable battery are stored on the distributed ledger in encrypted form.

In some examples, to authenticate the swappable battery by the authentication system includes: receiving one or more cell or battery characteristics; and comparing the one or more cell or battery characteristics against corresponding records of cell or battery characteristics of the swappable battery.

In yet further examples, the corresponding records of cell or battery characteristics are derived from a model of the cell or battery characteristics generated by machine learning, wherein training data to generate the model includes previously received cell or battery characteristics. This can be advantageous in providing more accurate authentication and account for changes in battery characteristics over time and use of the battery.

In some examples, the authentication system comprises a charger authentication processing device associated with the charging station to: authenticate the swappable battery; and/or associate the first code with the swappable battery.

In some examples, the authentication system comprises: a battery authentication processing device associated with the swappable battery to: authenticate the swappable battery; and/or associate the first code with the swappable battery; and/or authenticate the vehicle that received the swappable battery; and/or authenticate the first code; and/or authenticate the charging station that received the swappable battery.

In some examples, the authentication system comprises: a vehicle authentication processing device associated with the vehicle to: authenticate the vehicle; and/or authenticate the swappable battery received in the vehicle; and/or authenticate the first code of the swappable battery received in the vehicle.

In some examples, the authentication system comprises: a server, with a server processing device to: authenticate the swappable battery received at the charging station; and/or authorise the charging station to charge the swappable battery; associate the first code with the swappable battery; and/or authenticate the swappable battery received in the vehicle; and/or authenticate the vehicle that received the swappable battery; and/or authenticate the first code of the swappable battery received in the vehicle; and/or authenticate the charging station; and/or authenticate the swappable battery; and/or authenticate the vehicle.

In some examples, the charging station further comprises a vehicle charging interface to connect to the vehicle, wherein the charging station charges the swappable battery in the vehicle at the charging station via the vehicle charging interface.

In some examples, the battery network management system further comprises a power generation system to supply electrical power to the charging station, wherein the power generation comprises at least one of: solar power generation; wind power generation; hydroelectric power generation; biomass power generation; and/or refuse derived fuel power generation.

In some examples, the battery network management system further comprises power storage at, or proximal, to the charging station to supply electrical power to the charging station during peak power demand, and/or insufficient power supply from power generation sources.

In some examples, the battery network management system further comprising the vehicle(s) (9).

In some examples, the swappable battery comprises: a first plurality of cells, or group of cells in a battery module; and a second plurality of cell authentication circuits configured to authenticate each cell, or each battery module, wherein authentication of the swappable battery (5) with the authentication system (7) is dependent on the result of the second plurality of cell authentication circuits authenticating the first plurality of cells, or group of cells in the battery module.

There is also disclosed a vehicle comprising: a powertrain to drive wheels of the vehicle, wherein in a first mode the powertrain draws power from at least one swappable battery received in the vehicle; and a vehicle master controller. The vehicle master controller is configured to: verify the swappable battery received in the vehicle is authorised to transfer power to the vehicle, wherein authorisation includes confirmation the stored energy in the swappable battery was charged from an authorised charging station, wherein the first mode is conditional on the vehicle master controller verifying the swappable battery.

In some examples, the vehicle master controller is further configured to: receive, from the swappable battery, a first representation of a first code to attest the swappable battery was charged at an authorised charging station.

In some examples, the vehicle master controller is further configured to: receive, from a data store or a server, first evidence of the first code, wherein the first evidence is a record of the authorised charging station charging the swappable battery, wherein to verify the swappable battery includes confirming the first representation corresponds to the first evidence.

In some examples, the vehicle master controller is further configured to: send, to a server, the first representation, wherein the server receives first evidence of the first code from a data store, wherein the first evidence is a record of the authorised charging station charging the swappable battery, and receive, from the server, a result of a comparison of the first representation and the first evidence, wherein to verify the swappable battery is based on the result of the comparison.

In some examples, the vehicle master controller is further configured to: receive, from the swappable battery, a first identifier to identify the swappable battery; send, to a server, the first identifier; and receive, from the server, a result of a comparison of the first identifier to records in a data store, wherein records in the data store is evidence to attest the swappable battery was charged by an authorised charging station, wherein to verify the swappable battery is based on the result of the comparison.

In some examples, the vehicle is operable in a second mode, wherein in the second mode the powertrain generates power from kinetic energy of the vehicle to electrical energy to charge the swappable battery, wherein the second mode is conditional on the vehicle master controller verifying the swappable battery.

In some examples, the vehicle is operable in a third mode, wherein the third mode is operable when the vehicle master controller fails to verify the swappable battery is authorised to transfer power to the vehicle, wherein in the third mode, the vehicle is configured to draw a restricted level of power from the swappable battery to power a restricted subset of devices in the vehicle, and/or provide restricted power to the powertrain.

In some examples, the vehicle comprises a prime mover and the powertrain is an electric powertrain.

In some alternative examples, the powertrain is a hybrid powertrain comprising: at least one internal combustion engine; and at least one electric motor.

In some examples, the vehicle further comprises at least one trailer, and wherein the trailer comprises: a trailer powertrain to drive trailer wheels, wherein in the first mode the trailer powertrain draws power from the swappable battery, and/or a trailer swappable battery, a trailer controller to: verify the swappable battery, and/or trailer swappable battery, is authorised to transfer power to the vehicle, wherein the authorisation includes confirmation the stored energy in the swappable battery, and/or trailer swappable battery, was charged from the authorised charging station, wherein the first mode is also conditional on the trailer controller verifying the swappable battery, and/or trailer swappable battery.

In some examples, the trailer controller operates as a slave to instructions from the vehicle master controller.

In some examples, the vehicle further comprises at least one load sensor to measure at least one force between the prime mover and the trailer, wherein an output from the load sensor is processed by the vehicle master controller and/or trailer controller to control the powertrain and/or trailer powertrain to drive, or regenerate from, the wheels, and/or trailer wheels.

In some examples, the vehicle master controller and/or trailer controller further controls the powertrain and/or trailer powertrain based on topographical data, and/or historical driving data.

There is also provided a method of authenticating a swappable battery for charging and discharging in a battery network management system, the method comprising: authenticating, by an authentication system, a swappable battery received at a charging station; based on a result of authenticating the swappable battery, authorising charging the swappable battery at the charging station; associating a first code with the swappable battery to attest the swappable battery was authorised and charged at the charging station; authenticating, by the authentication system, a vehicle that receives the swappable battery and the first code of the swappable battery; based on a result of authenticating the vehicle and the first code, authorising discharging electrical power to drive the vehicle.

The method may further comprise: authenticating, by the authentication system, the charging station that receives the swappable battery, wherein charging the swappable battery is conditional on a result of authentication of the charging station.

In some examples, the method further comprises: storing first evidence of the first code in a data store, wherein authenticating the first code of the swappable battery is based on querying the first evidence in the data store.

In some examples, the data store comprises a distributed ledger and the step of storing first evidence comprises writing to the distributed ledger.

In some further examples, the data store comprises a blockchain based distributed ledger.

In some examples, the method further comprises: storing, in a battery data store, a first representation of the first code.

In some examples, the step of authenticating the first code comprises: comparing the first representation stored in the battery data store with the first evidence stored in the data store.

In some examples the authentication system comprises a server, wherein the server is in communication over a communications network with at least one of the charging station, the swappable battery, and the vehicle and configured to perform at least one of the steps in the method.

In some examples, authenticating the first code comprises: receiving, over the communication network from the swappable battery and/or the vehicle, the first representation of the first code; receiving, from the data store, the first evidence; sending, over the communication network to the swappable battery and/or vehicle, a result of comparing the first representation with the first evidence.

In some examples, the method further comprises the server: receiving, over the communications network from the swappable battery and/or the vehicle, a first identifier to identify the swappable battery; comparing the first identifier to records in a data store to identify, if any, a corresponding first code to authenticate; and sending, over the communications network to the swappable battery and/or vehicle, the corresponding first code or a result of authenticating the corresponding first code.

In some examples, the method further comprises: receiving, over the communications network, from the swappable battery and/or the vehicle, one or more identifiers associated with a cell, or group of cells, in the battery, and wherein authenticating the swappable battery comprises comparing the received on or more identifiers against corresponding records, stored in the data store, of identifiers associated with the swappable battery.

In some examples of the method, authenticating the swappable battery comprises: receiving one or more cell or battery characteristics; and comparing the one or more cell or battery characteristics against corresponding records of cell or battery characteristics of the swappable battery.

In yet a further example, the corresponding records of cell or battery characteristics are derived from a model of the cell or battery characteristics generated by machine learning, and wherein training data to generate the model includes previously received cell or battery characteristics.

There is provided a vehicle battery system comprising: a swappable battery including: a plurality of battery modules to output electrical power to a corresponding plurality of battery terminals; a battery receptacle including a plurality of receptacle terminals to electrically interface with the plurality of battery terminals; and an electrical circuit electrically connected to the receptacle terminals, wherein the electrical circuit is configured to combine power from the battery modules to output a specified output voltage.

In some examples, the vehicle battery system further comprises: a second battery receptacle including a second plurality of receptacle terminals to electrically interface with the plurality of battery terminals, wherein the second plurality of receptacle terminals are substantially the same configuration as the first plurality of receptacle terminals; and a second electrical circuit electrically connected to the second plurality of receptacle terminals, wherein the second electrical circuit is configured to combine power from the battery modules to output a second specified output voltage different to the specified output voltage.

In some examples, the battery receptacle and electrical circuit is part of a first vehicle, and/or the second battery receptacle and second electrical circuit is part of a second vehicle.

In some examples, the battery network management system described above utilises the vehicle battery system described above.

There is provided a vehicle comprising: a chassis; and a battery receptacle subframe. The battery receptacle subframe includes at least one rigid portion to support a battery received therein. The battery receptacle subframe is flexibly or resiliently mounted to the chassis, or the battery receptacle subframe includes a flexible or resilient portion, to isolate or reduce transmission of torsional forces on the chassis to the battery.

In some examples of the vehicle, the battery receptacle subframe is flexibly mounted to the chassis with at least one pivot.

The vehicle including the battery receptacle subframe and chassis can, in some examples, be adapted for use in the vehicles described elsewhere in this specification.

In some examples, the vehicle further comprises a battery compartment with a front opening, wherein the swappable battery is inserted and extracted via the front opening. This may be particularly advantageous in a prime mover where access to the rear of the prime mover is restricted with an attached trailer.

In some examples of the trailer, there is provided a battery receptacle configured to receive the trailer swappable battery from a side and/or below the trailer.

There is also provided a non-transitory computer readable medium with instructions to perform the method described above.

BRIEF DESCRIPTION OF DRAWINGS

Examples of the disclosure will be described with reference to the following drawings.

DESCRIPTION OF EMBODIMENTS

Overview of the System

Figure 1:
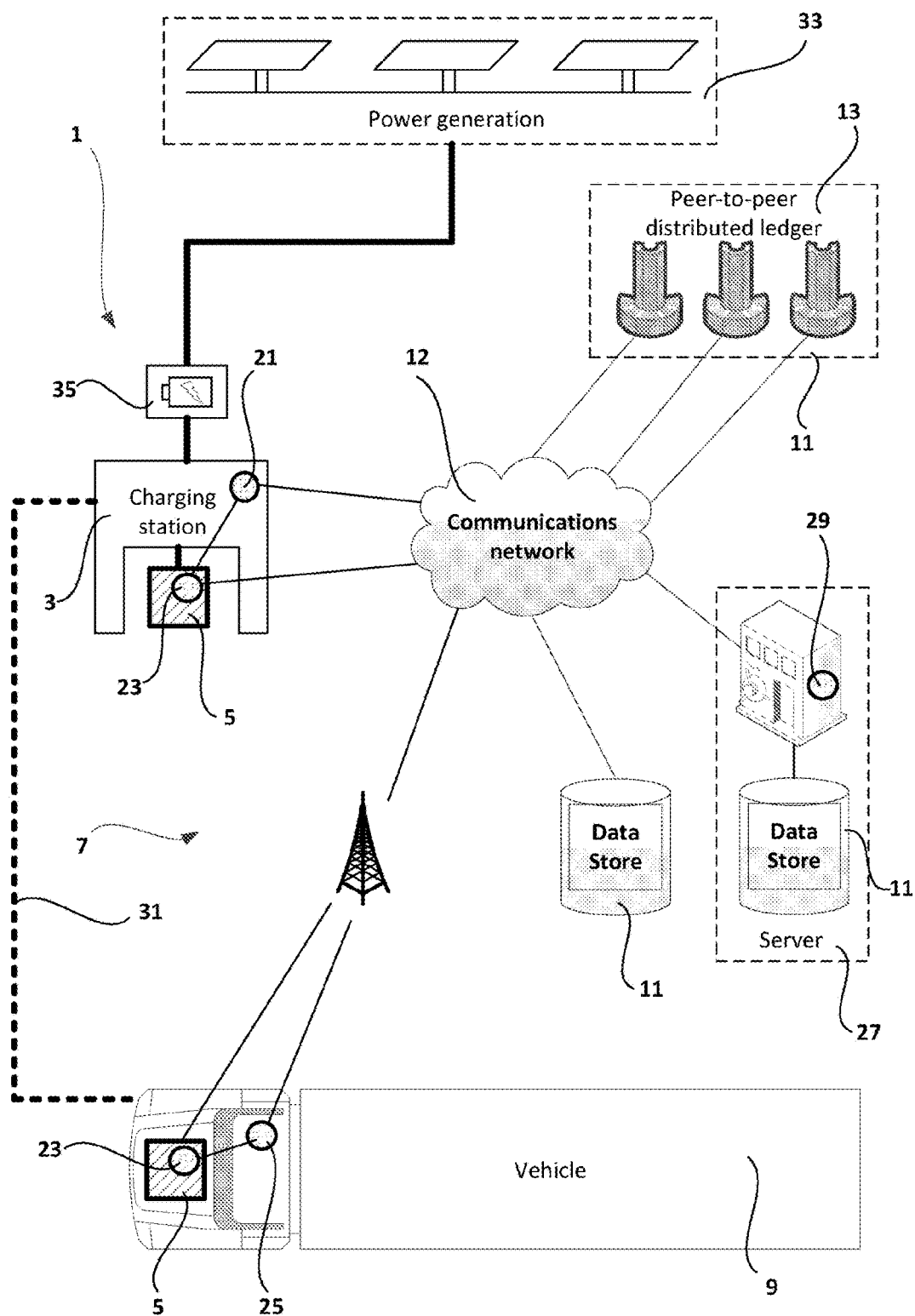
FIG. 1 is a schematic diagram of a battery network management system.

A battery network management system 1 is schematically illustrated in FIG. 1. The system includes a charging station 3 and at least one swappable battery 5. The swappable battery 5 is received in the charging station 3 for charging, and received in a vehicle 9 to discharge electrical power to drive the vehicle 9. In some examples, the outer casing of the batteries will be of standard dimensions (male) and the mating receptacle (female) frame will be located in the truck and charged station. In this manner truck manufacturers will be able to design the standard frame into heavy vehicle prime movers (tractors) in order that any heavy vehicle will be able to use the standard frame and batteries.

An authentication system 7 is provided to authenticate elements that interact with one another in the system 1. In some examples, this includes authenticating the charging station 3, the swappable battery 5 and the vehicle. In some examples, this includes verifying a first condition that a swappable battery 5 is authorised for charging with the charging station 3, and/or a second condition that the swappable battery 5 is authorised for discharging with a vehicle 9.

In one example, the authentication system 7 is a distributed system with elements located at different network nodes, such as a charger authentication processing device 21 at the charging station 3, a battery authentication processing device 23 at the swappable battery 5, and a vehicle authentication processing device 25 at the vehicle 9 that communicates with another element via a communications network 12.

In another example, the authentication system 7 has one or more functions performed at a server 27. This can include a centralised server 27 having a server processing device 29 that performs one or more of the steps of the method 300 of operating the system 1 as described below.

The system 1 also includes a data store 11, to store information and this can include a data store 11 at the server 27, or a data store 11 provided or hosted at another location or by another party. In other examples, the data store 11 can be a peer-to-peer distributed ledger 13 to provide robustness. In further examples, the data store 11 is blockchain based to assist in immutability of information stored therein.

The charging station 3 is supplied with power from a power generation source 33. Power generation can include conventional means via the electrical grid, or in other examples, bespoke power generation solutions co-located or proximal to the charging station 3. Power storage 35 can also be located proximal to the charging station 3 to assist during peak demand

Overview of the Method 300 of Authenticating a Swappable Battery 5

Figure 4:
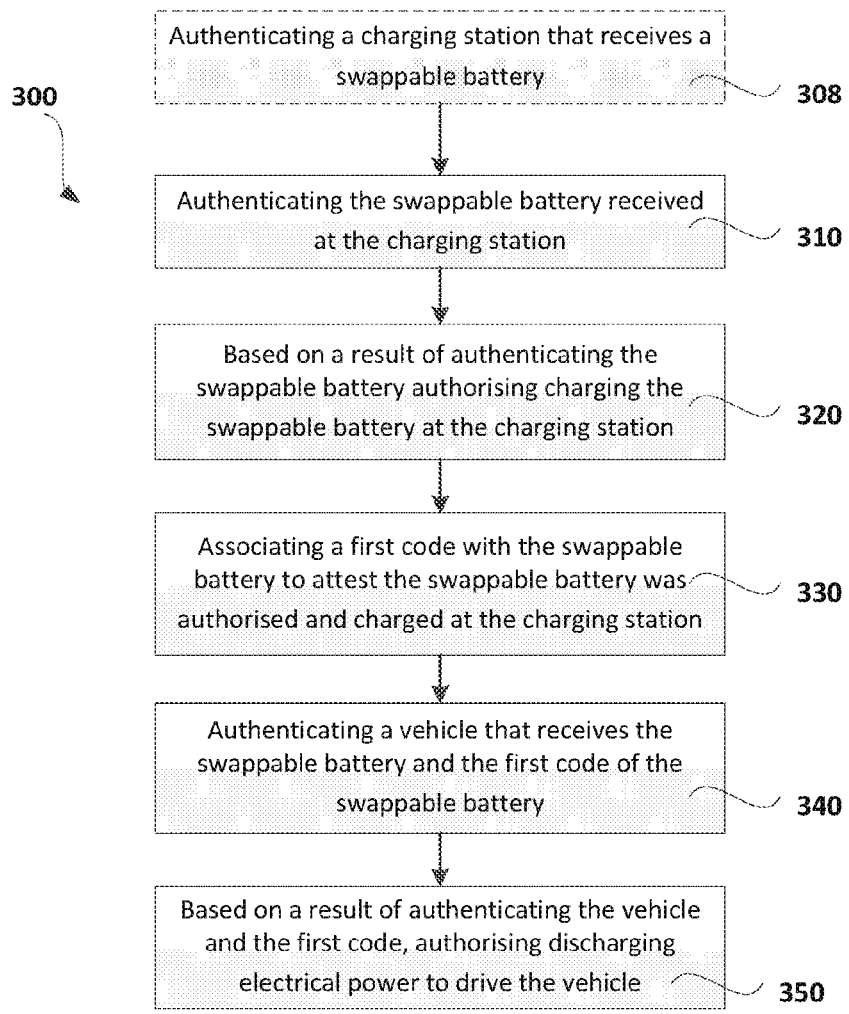
FIG. 4 is a flow diagram of an example method of authenticating a swappable battery for charging and discharging.

FIG. 4 illustrates a flow diagram of an example of a method 300 to authenticate a swappable battery 5 for charging and discharging in the system 1 described above. After a charging station 3 receives a swappable battery 5, the authentication system 7 attempts to authenticate 310 the swappable battery 5 is received at a charging station 3 (e.g. authenticating that the battery is part of the system 1 to satisfy a first condition). Based on a result of authenticating the swappable battery 5, the charging station 3 is then authorised 320 to charge the swappable battery 5. In some examples the authentication system 7 also authenticates 308 the charging station 3 to ensure the swappable battery 5 is only charged by authenticated charging stations 3.

If the swappable battery 5 is charged at the charging station 3, a first code 8 is then associated 330 with the swappable battery 5. The first code 8 attests that the swappable battery 5 was authorised and charged at the charging station 3 in accordance with the preceding steps. In some examples, a first representation 18 of the first code 8 is stored with the swappable battery 5. In other examples, first evidence 10 of the first code 8 is stored in the data store 11.

After charging, the swappable battery 5 is installed in a vehicle for use, subject to checks. This includes the authentication system 7 performing the step of authenticating 340 the vehicle 9 that receives the swappable battery 5 is part of the system 1 and can use the swappable battery 5. This also includes authenticating 340 the first code 8 of the swappable battery 5 which, in turn, is indicative that the swappable battery 5 was charged at an authorised charging station 3.

Finally, based on a result of authenticating the vehicle 9 and the first code 8 (as a second condition), the swappable battery 5 is authorised to discharge 350 electrical power to drive the vehicle 9 and be recharged during the regenerative braking cycle of the vehicle journey.

Advantages of the method may include certainty that batteries 5, charging stations 3, and vehicles 9 used with each other are part of an authenticated network that is authorised to be used with one another. This may be important for safety, licensing, regulation, fleet management, tracking, revenue generation and costing of the system and components thereof. This can reduce, or prevent, instances of use of unauthorised equipment (which may not be made to the same specifications) that can damage the system. Furthermore, in some examples this can provide the battery owner, charging station owner, or respective operators a means of collecting revenue and security of assets. In some examples, data from the swappable battery 5 in relation to battery charging, discharging, and use with charging stations 3 and vehicles 9 is sent to the server 27. This can include energy used (e.g. kWh), location information (including location where the batteries were swapped), distance travelled, energy consumption, trip information, associated temperature(s) and other metrics useful for the owner, operator, user, and/or researcher. In some examples, this information can be temporarily stored in the battery data store 17 (or at the vehicle 9), and downloaded and sent to the server 27 during battery swaps at the charging station 9. It is to be appreciated that other trigger points can be used to initiate transfer of this data, including insertion and/or removal of the battery 5 from a frame of either the charging station 3 or the vehicle 9. In yet other examples, the battery 5 may send this information in real-time or near real-time via cellular date to the communications network 12.

The components of the system and further aspects of the method will now be described in detail.

Authentication with Cryptographic Keys and Digital Signatures

In some examples, the first code 8 or first representation of the first code 8 could, by itself, be used to attest that the swappable battery 5 was charged by the charging station 3. For example, the charging station 3 can apply a digital signature to the first code 8 (using a private key of a private and public key pair of the charging station 3). The signed first code 8 (or first representation 18/first evidence 10), is then associated with the battery 5. Other network elements can verify the signed first code 8 by using the public key of the charging station 3 as proof that the charging station 3 has issued, or authorised, the first code 8. In other examples, the signed first code 8 (or signed first evidence 10 of the first code 8) is stored in a data store 11, and without storing the first code 8 on the battery 8 itself. Network nodes that wish to verify charging of the battery 5 can query the signed first code 8 from the data store 11 and use the public key of the charging station 3 to verify that the battery was charged at the charging station 3.

It is to be appreciated that in some further examples, the swappable battery 5, vehicle 9, and/or the server 27 also have respective public and private key pairs used for digital signature, authentication, and/or encryption. For example, digital signatures can be used to:

Attest that a particular swappable battery 5 is received in a particular charging station. This can be achieved by the battery authentication processing device 23 applying a digital signature (associated with the battery) to a message indicative of this fact. The message is also be signed by the charger authentication processing device 21 with the digital signature associated with the charging station 3. A node wanting to confirm this status can then verify the signed message by using respective public keys of the swappable battery 5 and charging station 3

Attest that a particular swappable battery 5 is received in a particular vehicle 9. This can be achieved by both the battery authentication processing device 23 and vehicle authentication processing device 25 applying their respective digital signatures in a similar manner to the example above.

Power Generation 33 and Power Storage 35

Power generation 33 can include renewal energy sources, such as solar power generation, wind power generation, hydroelectric power generation, waste to energy (i.e. refuse derived power generation) and/or biomass power generation. To reduce line losses, or conversion losses to high voltage power, power generation 33 can be co-located, or proximal to the charging station 3. This includes selecting an energy source that is most efficient for the location of the charging station. For example, where a charging station is in a desert or arid environment, solar power generation near the charging station 3 may be the most efficient. Where a charging station is located near farmland, biomass power generation could be advantageous.

It is to be appreciated that other power generation could be used, including using power generated for existing electrical grids. This includes power derived from fossil fuels, such as coal power plants, gas power plants, as well as nuclear power plants.

The energy consumption of the charging station 3 can be variable, based on demand for charging and this may not coincide efficiently with power generation from renewable sources and/or with lowest cost of power (e.g. "off-peak") from the electrical grid. Furthermore, the power requirements of the charging station, in some examples, can have a peak that exceeds the level of power that the power generation 33 can supply, or supply efficiently. Therefore, in one example power storage 35 can be located at, or proximal, to the charging station 3 to assist during peak demand Power storage 35, as well as the swappable batteries 5, can be beneficial for other reasons such as supplementing the electrical grid. For example on weekends or public holidays the power storage 35 and swappable batteries 5 at the charging stations 3 can be substantially full and minimal demand is expected the next day (for example it is Sunday tomorrow). In such cases, the energy in power storage 35, or swappable batteries 5, can be discharged into the grid and act as a peaking station thus increasing battery utilisation.

In some examples, power storage 35 includes batteries to store electrical power to act as a buffer. Batteries can include lithium-ion batteries, Ni-MH batteries, sealed lead acid batteries, super capacitors, etc.

In other examples, power storage 35 can include storage interrelated to the power generation system. For example in a hydroelectric system, power can be stored by pumping water upstream above a dam for later power generation. In a solar power generation system using concentrated solar power (CSP) or other thermal based energy generation method, thermal energy storage (such as storing molten salt), can be used to store energy for later power generation.

Charging Station 3

Charging station 3 can be located along major traffic routes and vehicle depots. Locations with charging station 3 can be the equivalent of a gas station (e.g. petrol station, fuel pump) in that a vehicle 9 can quickly receive energy requirements. Thus in some examples, the charging stations 3 can charge multiple swappable batteries 5 concurrently, and whereby swappable batteries are charged in anticipation of needs of vehicles 9 stopping at the charging station 3. In particular, a vehicle 9 can swap a depleted swappable battery 5 for an already charged swappable battery 5, that can reduced the downtime for the vehicle 9 to a time less than or comparable to filling a fuel tank of a conventional internal combustion vehicle. For example, filling a conventional truck tank may take around 20 minutes whilst a battery swap could be accomplished quicker. In some examples, a battery swam may take less than 2 minutes.

In some examples, the charging station 3 includes a female receptacle to receive the male swappable battery 5. The receptacle at the charging station 3 can be of a similar form or shape to a corresponding receptacle used in the vehicle 9. This can include a rack or rail system for the swappable battery 5 to be inserted into the charging station 3.

In some examples, the charging station 3 further includes a robotic system to assist in swapping the swappable battery 5 between vehicles 9, the charging station 3, and a storage area for batteries. This can include an autonomous or semi-autonomous system to detect a vehicle 9 at the charging station 3 requiring a battery swap and operating to remove an exhausted battery 5 from the vehicle, insert a charged battery 5 into the vehicle, and inserting the exhausted battery 5 into the charging station 3 for charging.

In other examples, the swappable battery 5 can be moved manually or with lifting equipment. For example, a fork lift (or other lifting equipment) can be used to assist lifting and removal of the swappable battery 5 between the vehicle 9, charging station 3 and storage area.

The charging station 3 is associated with a charger authentication processing device 21. The charger authentication processing device 21 can communicate with the swappable battery 5 received at the charging station 3 so that the swappable battery 5 can be authenticated to satisfy the first condition.

Figure 5:
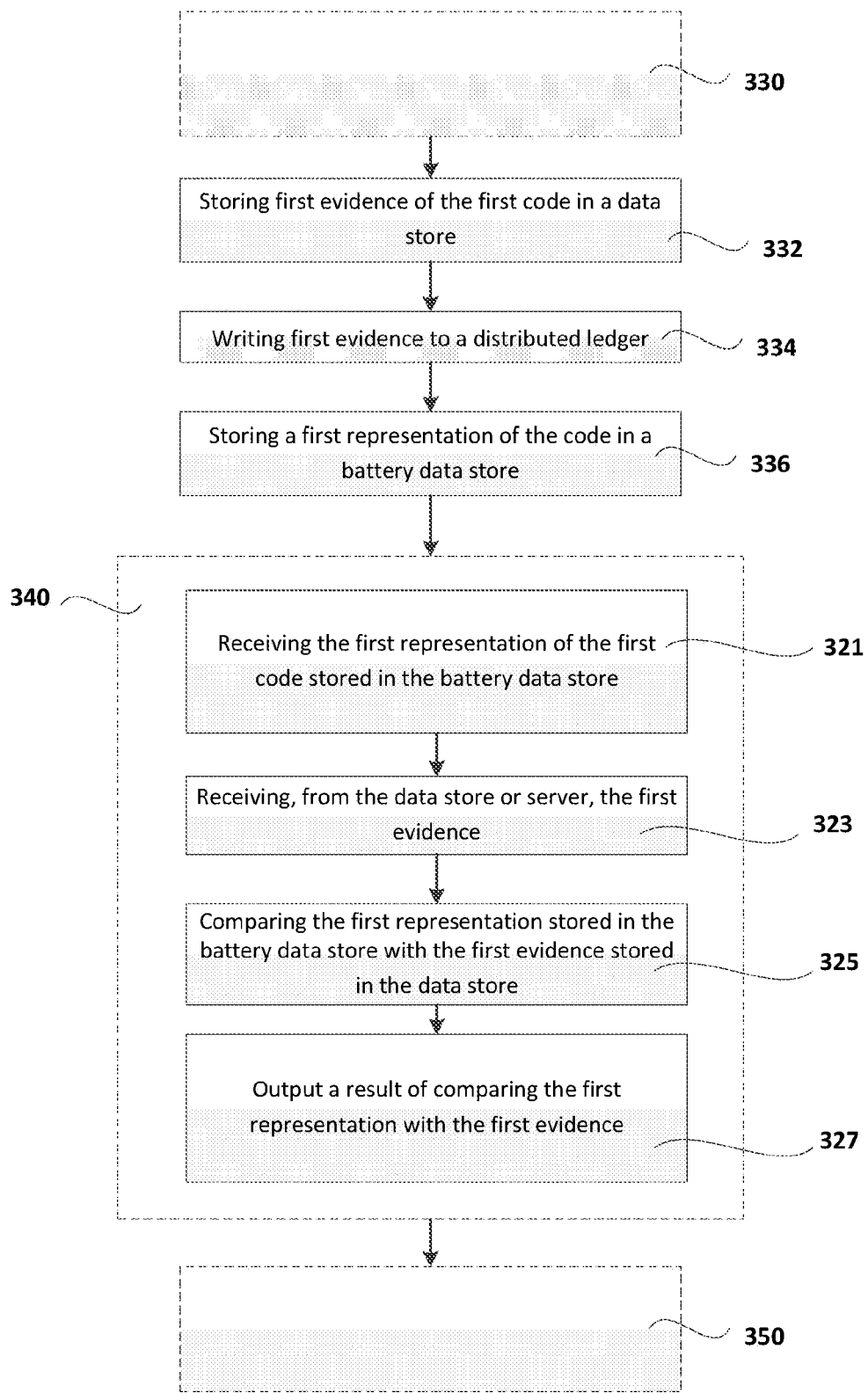
FIG. 5 is a flow diagram of an example of further steps of the method in FIG. 4.

In some examples, the charger authentication processing device 21 also functions to assist in confirming the swappable battery 5 was authorised, and charged, at the charging station 3. This includes associating a first code 8 to the battery 5 to attest that the swappable battery 5 was charged at the charging station 3. As illustrated in FIG. 5, this can include sending a first representation 18 of the first code 8 to the swappable battery 5 so that the first representation can be stored 336 in the battery data store 17. This can include sending the first representation 18 directly to the battery 5, via the communications network 12, via the data store 11, and or server 27.

In another example, the charger authentication processing device 21 sends first evidence 10 of the first code 8 to be stored 332 in a data store 11. This can include storing the first evidence 10 in a separate data store 11, a data storage service, or a data store 11 of the server 27. In yet another example, the charger authentication processing device 21 can send the first code 8 (or other information) such that first evidence 10 of the first code 8 can be written 334 to a distributed ledger 13 (which will be discussed in a separate section below).

In some examples, the charger processing device 21 is part of the distributed authentication system 7. The charger processing device 21 can receive information, such as from the swappable battery 5, the data store 11, and/or the vehicle 9 and perform the steps of authenticating the swappable battery 5 or other elements of the systems, and/or associating the first code 8 to the battery 5 to attest the battery was charged at the charging station 3. This can include the charger processing device 21 receiving representations of the first identifier, or identifiers for cells or group of cells (e.g. cell ID), to authenticate the swappable battery 5.

In other examples, the charger processing device 21 receives information from the swappable battery 5, such as a first identifier 111 or identifiers for cells or groups of cells (e.g. cell ID), and passes the information to a server 27 to authenticate the battery 5. Other functions of the authentication system 7, can also be processed at the server 27, and thus in these other examples the charger processing device 21 merely acts as a terminal or peripheral device to communicate with other network elements and operators. An example of interaction with a server 27 is illustrated in steps 311, 313, and 314 in FIG. 7 and will be described in a separate section below.

Other examples of charging stations 3 may exist where the battery 5 may be charged in situ in the vehicle 9. In such charging stations 3 the charger may also be authenticated by the vehicle 9 and battery 5 prior to allowing charge to occur.

Examples of charging station 3 may have a vehicle charging interface 31 to connect to the vehicle 9. This can include a charging cable to directly charge a swappable battery 5 in a vehicle 9 at the charging station. In some examples the vehicle charging interface 31 also includes a communications system so that the swappable battery 5, vehicle 9 (and processing devices therein) can communicate with the charging station 3 and/or the communications network 12, data store 11, and/or server 27.

In other examples, the vehicle charging interface 31 can be wireless, such as via an inductive charger to the vehicle 31, and/or a wireless communications system.

In some examples, the charging station 3 associates charging information to the first code 8, first evidence 10, and/or first information 18. This can include the energy used to charge the swappable battery, the energy charged in the swappable battery, the state(s) of charge before and after charging the swappable battery, the time, and/or cost(s) to charge the swappable battery 5. In turn, such charging information can be used by the charging station 3, server 27 or other entity to credit, debit account(s) of a user of the swappable battery 5 and/or charging station 3.

Swappable Battery 5

The swappable battery 5 is a secondary battery (i.e. rechargeable battery) that stores energy to supply electrical energy to a vehicle 9. This can include multiple cells arranged together to form the swappable battery.

The swappable battery 5 can utilise chemistry including, lithium-ion batteries, lithium-ion polymer batteries, nickel-metal hydride batteries, and/or lead-acid batteries. It is to be appreciated that other available chemistry types suitable for use in an electric vehicle can be used.

In some examples, the swappable battery 5 is charged with an electrical energy input from the charging station 3, and discharges electrical energy as an output to the vehicle 9. In some particular examples, electrical energy is the main input and output from the batteries thereby minimising the need for other resources to charge the battery. However, in some examples, the swappable battery 5 can have some consumables or serviceable components, such as coolants that need to be checked and/or replaced from time to time.

The swappable battery 5 can include a form factor of a "male" component to be received in a female receptacle of the charging station 3 and vehicle 9. This can include a general square or rectangular prism shape, a cylindrical shape, or combination thereof etc. In some examples, the swappable battery 5 has rails, or components of a rail system, to assist in easy insertion and extraction of the swappable battery 5 from the charging station 3 or vehicle 9 as well as a system to ensure that the battery is located correctly and proper contact is made with mating electrical connections. Electrical contact point on battery 5 and receptacle may have a system to exclude dust and other contaminants during the swapping procedure (and/or when the battery is in situ). Electrical contact points may be spring loaded or other pressure means and multiple contacts points in order to ensure that constant contact is proper with battery and charge/discharge receptacle.

In some examples, the swappable battery 5 has a battery authentication processing device 23 to control, or affect, the operation of the swappable battery 5. This includes operations to authenticate the swappable battery 5 to the charging station 3, the vehicle 9, the server 27 and/or other components to the authentication system 7. This can also include controlling whether the swappable battery 5 will charge or discharge based on authentication with other elements of the system. This can also include authenticating the first code 8, and/or the corresponding first representation 18, and/or first evidence to attest that the swappable battery was charged at the charging station 3. This can also include the swappable battery 5 authenticating 308 the charging station 3 that has received the battery 5.

The swappable battery may also include a battery data store 17 to store 336 information related to the battery. This can include a first identifier, identifiers for respective cells of the battery, cell characteristics of the cells in the battery, a first representation 18 of the first code 8 (that, in some examples, includes the first code 8 itself), log information of the battery including charging and discharging information, etc.

The battery authentication processing device 23 and/or battery data store 17 may be located in a tamper proof (or tamper resistant) housing in the swappable battery 5. In some examples, this may include locating such components, or part of these components, in a central location in the battery 5 such that tampering would involve substantial disassemble or destruction of the battery 5 (and associated components) and thereby discourage tampering. In further examples, the battery includes tamper indicator and/or tamper sensors to alert the battery authentication processing device 23, and/or authentication system 7 of tampering.

In some examples, the swappable battery comprises a plurality of cells, or a plurality of battery modules (where each battery module is formed of a group of cells). The cells in turn, may have an unique electronic identifier (such as a "cell ID" or other authentication means) associated with the cell for authentication of the cell, or a group of cells in a battery module. In some examples, the authentication system 7 is configured to authenticate the swappable battery 5 by authenticating the unique electronic identifier(s) of the cells of the swappable battery 5.

This can include having a plurality of cell authentication circuits associated with each cell, or group of cells in a battery module. The cell authentication circuit can be configured to receive a query from the authentication system 7 to authenticate that cell or battery module. In turn, the cell authentication circuit provides a response to the authentication system 7 to enable authentication. In some examples, the cell authentication circuit can be at least part of, or a modified, battery protection circuit.

In some examples, each cell, or group of cells in a battery module, has an identifier (such as a "cell ID") for authentication purposes. This can include an identifier that is unique, or otherwise suitable, for authenticating that cell or group of cells. In some examples, the identifier is stored in a memory corresponding to each cell, or group of cells, in a tamper-proof or tamper-resistant manner Thus attempts to remove the memory will destructively damage the memory such that the identifier cannot be read or reused for another cell or group of cells. In some examples, the cell authentication circuit reads the identifier and applies encryption steps to the identifier (cell ID) before transmission to the server 27 and/or an authentication method.

In one example this can be achieved by a private and public key pair associated with the cell (or battery module). On receiving a query from the authentication system, the cell authentication circuit can digitally sign, with the private key, a response for the authentication system 7. The authentication system 7, in turn can authenticate the response, and thus the cell or battery module, with a known corresponding public key. The public key(s) may be associated with battery and stored in the data store 11 and/or distributed ledger 13.

The private key may be stored in a memory of the cell authentication circuit such that removal or tampering of the cell authentication circuit, cell, or battery module will destroy or erase the private key. In one example, the private key is stored in volatile memory of the cell authentication circuit powered by the cell or battery module. If the cell authentication circuit is separated from the cell or battery module, such as during tampering, the volatile memory will lose the private key to render that cell or battery module inoperable.

In another example, the cell authentication circuits may use a rolling code for authenticating the cell or battery module.

In one example, cell authentication circuit may communicate with the authentication system 7, at least in part, wirelessly such as using RFID technology. This may aid manufacture and assembly as each swappable battery may have multiple cell authentication circuits, whereby wireless technology reduces wiring requirements. In another example, the cell authentication circuits communicate to the authentication system 7, at least in part, via a separate wired communications link. This may be advantageous to reduce chances of interference, jamming, or interception, in environments with crowded wireless networks. In yet another example, communication to the authentication system 7, at least in part, can be via the power lines/cables. That is, using power line communication technology to send and receive authentication data between the cell authentication circuit and the authentication system 7.

In one example, authenticating the swappable battery 5 is based on authenticating the corresponding unique electronic identifiers of all the plurality cells. This may be indicative that all the cells are free from tampering. In another example, authenticating the swappable battery 5 is based on authenticating a substantial majority, or at least a threshold level, of the unique electronic identifiers of the plurality of cells. This may be advantageous in some examples in case one or more of the cells or respective electronic identifiers fail. The battery will still be able to operate to provide a robust swappable battery but balanced with the advantages of stopping use of a battery that has been substantially tampered. In yet another example, each of the cells are configured to charge/discharge only if that cell has been authenticated with the unique identifier whilst those that have not been authenticated will be prevented from charging/discharging.

A selectively operable locking system can be provided to ensure the swappable battery 5 remains secure in the vehicle 9 and/or charging station 3. This can include manually operated locks and/or locks controlled by respective processing devices of the battery 5, charging station 3 and/or vehicle 9.

Figure 2:
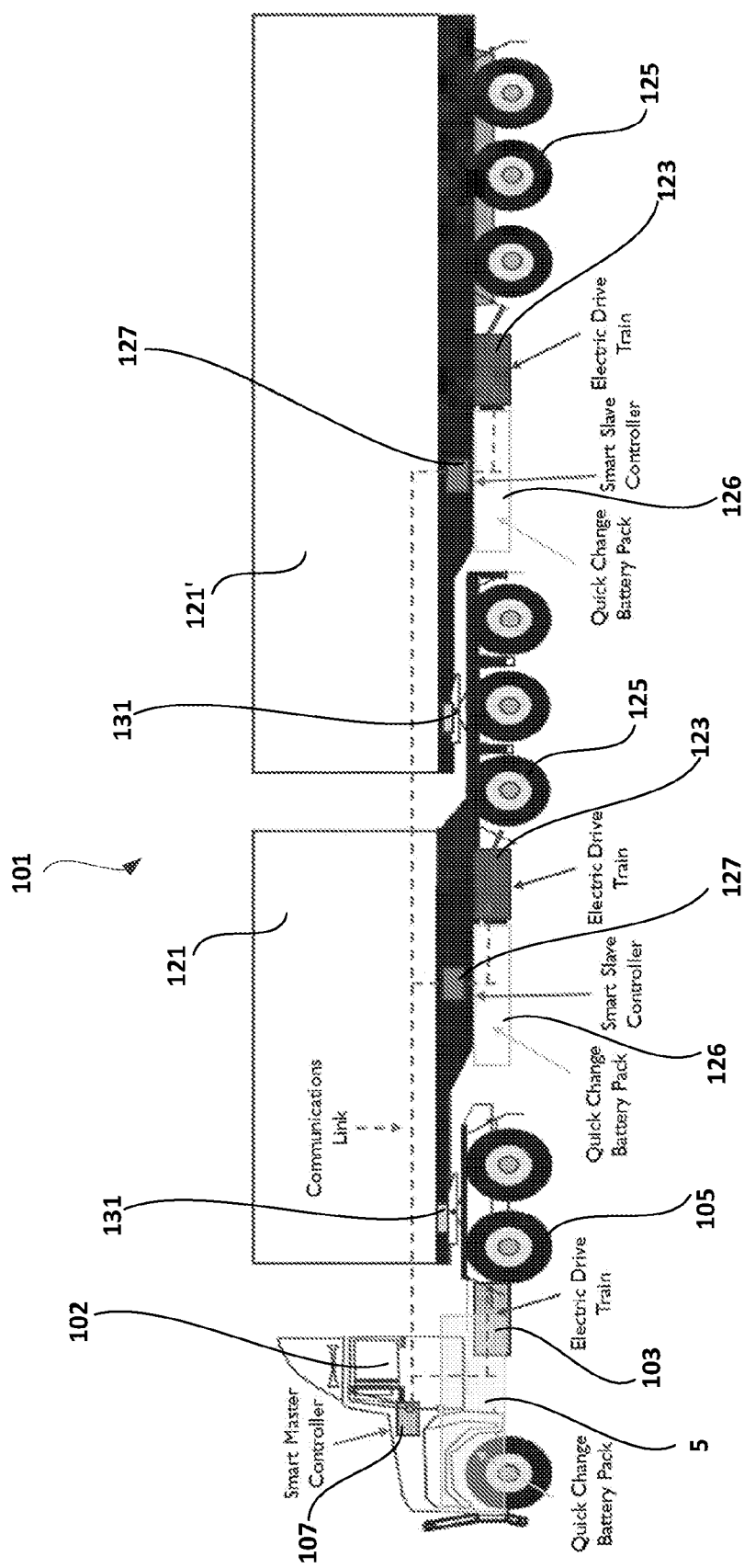
FIG. 2 is a schematic example of an electric vehicle using batteries in the system illustrated in FIG. 1.
Figure 3:
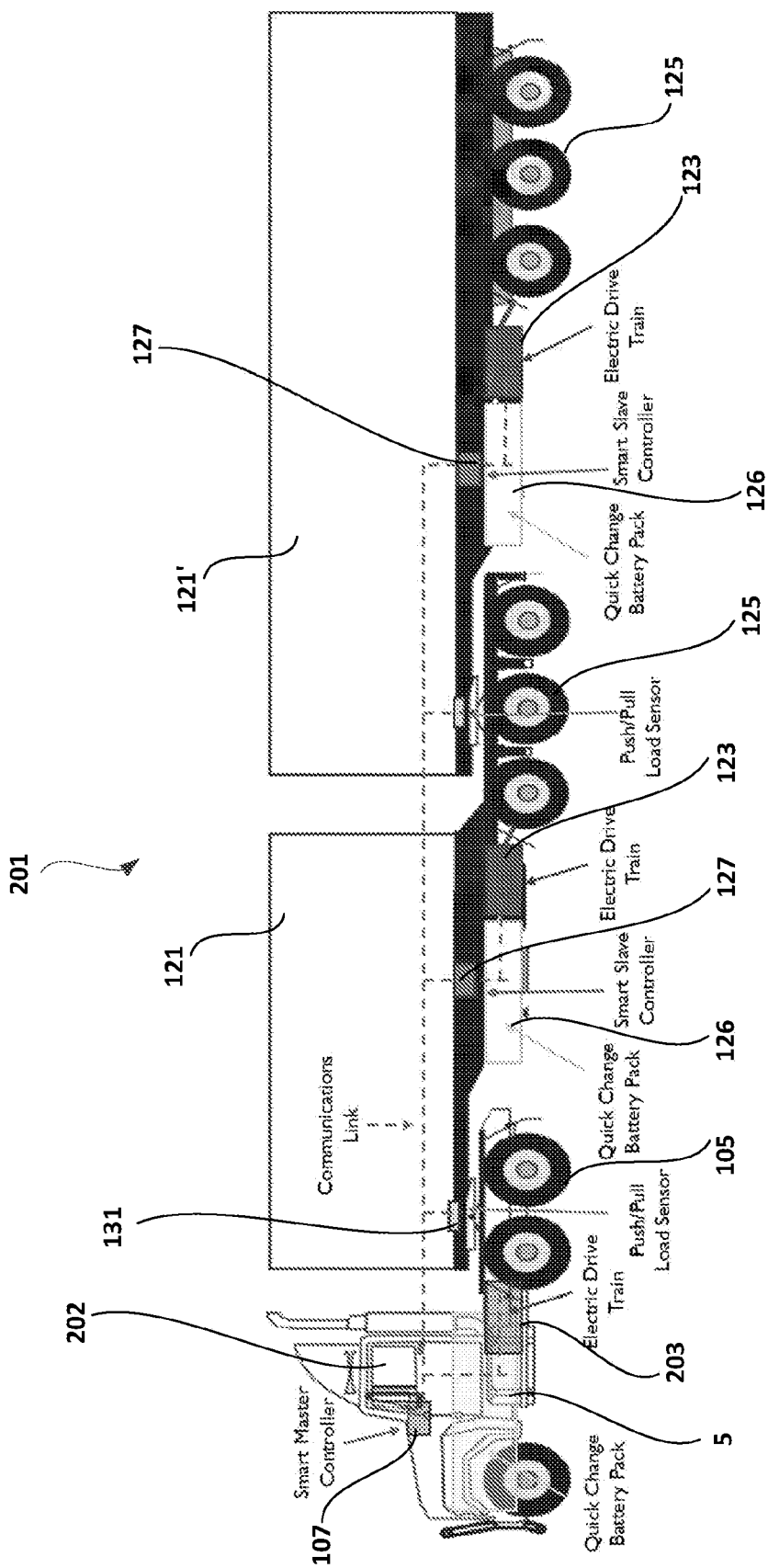
FIG. 3 is a schematic example of a hybrid vehicle using batteries in the system illustrated in FIG. 1.

Referring to FIGS. 2 and 3, a trailer swappable battery 126 can be used in a trailer 121 of a vehicle 9, 101. The trailer swappable battery 126 may be the same as the swappable battery 5 or functionally similar to the swappable battery 5. In other examples, the trailer swappable battery 126 may have a different form factor to the swappable battery 5. For example, the trailer swappable battery 126 may have different size and form factor to suit the size an constraints of the trailer 121. In some examples, this can include having a trailer swappable battery 126 with a flat and elongated shape to fit below the trailer bed. In some examples, the trailer swappable battery 126 can be a higher capacity. In yet another example, the trailer 121 can receive multiple batteries, than may include two or more swappable batteries 5 or trailer swappable batteries 126.

Vehicle 9, 101, 201 and Trailer 121

An example of the vehicle 9, 101, 201 will now be described with reference to FIGS. 1 to 3. The vehicle 9 can be an automotive vehicle, including trucks, prime mover with trailers (semi-trailers), road trains, and other road or off-road vehicles. The disclosure may have applications with logistics vehicles such as prime movers 102 with trailers 121 and the non-limiting example below will be described in this context.

The vehicle 101 in FIG. 2 includes a powertrain 103, comprising at least one electric motor, to drive wheels 105. The powertrain 103, at least in part, draws power in a first mode from at least one swappable battery 5 received in the vehicle 101. In this example, the swappable battery 5 is received in a female receptacle of the prime mover 102, but it is to be appreciated that in other examples the power can be received elsewhere such as the trailer swappable battery 126.

The vehicle also includes a vehicle master controller 107 to control operating modes of the vehicle 9 and/or the swappable batteries 5, 126 received therein. In particular the vehicle master controller can be used to verify that the swappable battery 5, 126 is authorised to transfer power to the vehicle 101, which includes or is associated with at least part of step 340 of the method 300. This authorisation can include confirmation that the stored energy in the swappable battery was charged from an authorised charging station 3. In some examples, the confirmation is determined based authenticating the first code 8 of the battery 5.

In some examples, the vehicle master controller 107 includes a vehicle authentication processing device 25, or communicates with the vehicle authentication processing device 25, that assists with steps 340 and 350 and to determine an occurrence of the second condition. Referring to FIG. 5, this can include the vehicle authentication processing device 25 receiving 321 the first representation of the first code 8 from the battery data store 17. The vehicle authentication processing device 25 also receives 323, from the data store 11 or server, first evidence 10 of the first code 8. In some examples, this can include the first code, log or other records of the swappable battery 5 or charging station 3 that can be used to verify the first representation. The first representation 18 can then be compared 325 with the first evidence 10, whereby result of the comparison is used to authenticate the first code 8. This result is then output 327 to authorise 350 use of the battery 5 with the vehicle 9.

The vehicle master controller 107 can authorise different modes of operation of the vehicle 101. For example:
a. A first mode to supply energy to the powertrain 103 of the vehicle. The vehicle master controller 107 can authorise the first mode based on the condition that the swappable battery 5, 126 is verified.
b. A second mode to generate power from kinetic energy of the vehicle to electrical energy to charge the swappable battery 5, 126. The vehicle master controller 107 can authorise the second mode based on the condition that the swappable battery 5, 126 is verified and capable of regenerative charging.
c. A third mode to supply a restricted level of power from the swappable battery. The vehicle master controller 107 may authorise this mode if the controller 107 fails to verify the swappable battery 5, 126 is authorised to transfer (normal) power to the vehicle 101. In some examples, this includes authorising a restricted level of power to power a restricted subset of devices in the vehicle (such as hazard lights, parking brakes, alarms, the vehicle master controller 107, the vehicle authentication processing device 25, and other essential or safety devices etc.). In some examples, the restricted level of power includes providing restricted power to the powertrain 103 so that the vehicle 101 can manoeuvre to a breakdown lane, a parking spot, a tow truck, or move at a limited speed or range (e.g. a "limp mode").

The vehicle master controller 107 can also communicate with one or more trailer controllers 127. The trailer controller 127 can act as a slave to instructions from the vehicle master controller 107. The trailer controllers 127, in turn, can control flow of power between two or more of: the swappable battery 5, the trailer swappable battery 126, the powertrain 103, and the trailer powertrain 123. In some examples, the trailer controllers 127 primarily control, and authorise, between the trailer swappable battery 126 and the trailer powertrain 123.

The trailer controllers 127 can perform similar functions to the vehicle authentication processing device 25, and/or the vehicle master controller 107 to verify that the swappable battery 5, or trailer swappable battery 126, is authorised to transfer power to the vehicle. This includes confirming the battery 5, 126 was charged at an authorised charging station 3.

The vehicle 9, 101, 201 may also include a communications device to connect to the communications network 12. This can include cellular, or other wireless communications devices, so that the vehicle can send and receive information from the data store 11, server 27, and/or charging station 3 to allow, or assist, in the authentication steps.

The vehicle 101, 201 may also include a load sensor 131 to measure at least one force between the prime mover 102 and the trailer (or loads between trailers for multi-trailer vehicles). The load sensor 131 can be located at, or proximal to, the hitch point to determine the relative forces with the trailers. The output of the load sensor 131 can be processed by the vehicle master controller 107 and/or trailer controller 127 to determine appropriate outputs for the powertrain 103 and trailer powertrain 123. This may include applying power to the powertrain 103, 123, or using regenerative braking, to reduce the relative forces between the vehicle and trailers (or trailer and trailer). In some other examples, this may also include maintaining a specified force (or keeping a force in a specified range) to reduce the risk of jack-knifing.

FIG. 3 illustrates an example of another vehicle 201, whereby the vehicle 201 utilises a hybrid powertrain (203) comprising at least one internal combustion engine and at least one electric motor. In some examples, the prime mover 202 has a hybrid powertrain of both an internal combustion engine and an electric motor.

In another example, the vehicle 201 has a hybrid powertrain based on a prime mover with an internal combustion engine coupled with a trailer 121 as described above with an electric trailer powertrain 12.

Conventional Data Store 11 in a Distributed Authentication System 7

In an example of a distributed authentication system 7, the data store 11 may write information and return information from queries made by the processing devices of the charging station 3, battery 5 and vehicle 9. In turn, the authentication steps are primarily performed at such recipient nodes. That is, the authentication system 7 is distributed and that the steps are performed at processing devices 21, 23, 25 at the charging station 3, battery 5 and vehicle 9.

Information in the data store 11 can include one or more first code(s) 8 associated with the swappable batteries 5, first evidence (10) of the first code(s), log information, authentication information and/or other information associated with the battery 5, charging station 3 and vehicle 9.

Distributed Ledger 13 as a Data Store 11

In some examples, the data store 11 includes a distributed ledger 13 used to store information, whereby such information is made available for the authenticating system 7 to perform the authentication functions.

A distributed ledger 13 can be advantageous in that authentication information is distributed to remove a single point of failure to make the system more robust. For example, if the system 1 relied on information from a single data store 13, the failure of that data store 11 can lead to a network wide outage with the consequence of stopping an entire fleet of vehicles 9, charger stations and batteries 5 from operation.

A distributed ledger 13 allows additional sources of information so that failure of a data storage node is not fatal to the continued operation of the system. In some further examples, the distributed ledger 13 involves nodes of a peer-to-peer network to decentralise tasks and storage of information. This involves a consensus algorithm to ensure the information stored in the nodes of the distributed ledger 13 correspond with one another.

In some examples, the information is stored in a blockchain based system. That is, information, such as first evidence 10 of the first code 8, and other information required for authentication purposes, are stored in blocks. Each block typically has data (i.e. information) associated with a corresponding time period for that block plus a result of a hash function of the previous block. The block, in turn, is then put through a hash function and the result of this is provided for the subsequent block. This can be repeated to form a chain of blocks. Importantly, this can be used to provide a robust, immutable, record of information that was recorded at the corresponding time periods. In particular, it is difficult (if not impossible) to edit previous blocks without affecting the contents of subsequent blocks. Therefore a blockchain based system can be used as evidence or proof of information that was recorded in the blockchain. Verifying such information can be performed by analysing the Merkle tree and the leaf corresponding to the corresponding time period and information. Furthermore, a blockchain based system may also increase security to reduce (or prevent) the effects of hacking, unauthorised use of batteries and chargers, and other nefarious behaviour.

In some examples, the distributed ledger is configured to store data including data associated with identifier(s) for the battery 5 and/or identifiers for specific cells, or group of cells. In some examples, such data is in encrypted form to allow authentication of a battery or cells of a battery without having a public record of the identifiers in unencrypted form. In some examples, authentication of the data associated with identifiers include comparing the identifiers with records on a blockchain of the distributed ledger.

Server 27 in a Distributed Authentication System

In some examples, the authentication system 7 relies on processing by the server processing device 29, to perform one or more tasks to assist in authentication of the swappable battery 5, 126, the charging station 3, the vehicle 9, and the authorised uses thereof with each other. That is, the server 27 can be part of a distributed authentication system 7.

In such examples, the server processing device 29 can be configured to receive information to perform one or more of:
  authenticate the swappable battery (5); and/or
  authenticate the swappable battery (5) received at the charging station (3); and/or
  authenticate the swappable battery (5) received in the vehicle (9); and/or
  authenticate the charging station (3); and/or
  authorise the charging station (3) to charge the swappable battery (5);
  authenticate the vehicle (9); and/or
  authenticate the vehicle (9) that received the swappable battery (5); and/or
  associate the first code (8) with the swappable battery (5); and/or
  authenticate the first code (8) of the swappable battery (5) received in the vehicle.

One or more of the above tasks may be performed in response to a query, or notification from, the charging station 3, swappable battery 5, and/or vehicle 9, and the result of which returned to one or more of these elements of the system, and/or stored in the data store 11.

Figure 6:
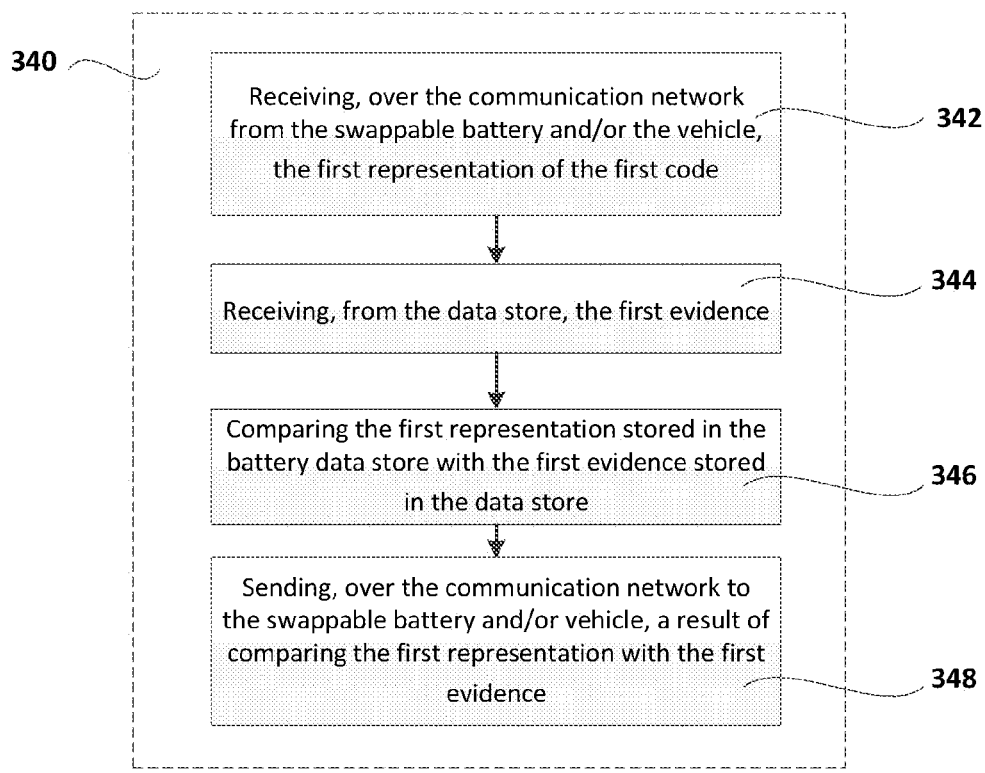
FIG. 6 is a flow diagram of another example of further steps of the method in FIG. 4 performed at a server.

An example of this is illustrated in FIG. 6, whereby the server 27 is tasked with the step of authenticating 340 the vehicle 9 and the first code 8. This may be initiated by the vehicle 9 receiving the battery 5, whereby the vehicle authentication processing device 25 (and/or vehicle master controller 107), automatically reads the first representation 18 from the battery. Subsequently the swappable battery and/or vehicle 9 sends the first representation 18 that is received 342 at the server 27. The server 27 then receives 344, from the data store 11, first evidence 10 of the first code 8. The server processing device 29 then compares 346 the first representation 18 and the first evidence 10, the result of which is indicative of whether the battery 5 was charged at the charging station 3. This result, in turn, can also be used to determine if the swappable battery 5 is authorised to discharge power to the vehicle 9.

The server 27 can then send 348, the result of this comparison to the swappable battery 5 and/or the vehicle 9 which (if a positive result) enables the processing devices at the swappable battery 5 and vehicle 9 to authorise use with each other. In some examples, sending 348 the (positive) result can be considered an authorisation from the server 27 for use of the battery 5 and the vehicle. Data from the swappable battery 5 such as an identifier (e.g. cell ID) for cell, or group of cells, may also be sent to the server 27 for authenticating the swappable battery 5 that is at a charging station 3 or vehicle 9. In some examples, multiple identifier(s) for the cell ID is authenticated against an identifier (or record) for the swappable battery 5. This can be used to check that specific cells correspond to the swappable battery 5. This prevents swapping, switching (or otherwise substituting) battery cells within a swappable battery 5 (unless authorised). This can reduce or prevent instances of rebirthing of components (or identifiers) associated with a swappable battery 5 that has been damaged in an accident or substituting unauthorised cells in to a swappable battery 5 that has reached the end-of-life.

In some examples, data from the swappable battery 5 in relation to battery charging, discharging, and use with charging stations 3 and vehicles 9 is sent to the server 27. This can include the server 27 receiving information on the state of charge of batteries 5, charging of batteries by the charging station 3, and/or use of batteries 5 and vehicles. This may also include energy used (e.g. kWh), location information (including location where the batteries were swapped), distance travelled, energy consumption, trip information, associated temperature(s) and other metrics useful for the owner, operator, user, and/or researcher. This information can be used to determine the costs of such use to debit/credit accounts of users and providers in the system.

In some examples, this information can be temporarily stored in the battery data store 17 (or at the vehicle 9), and downloaded and sent to the server 27 during battery swaps at the charging station 9. It is to be appreciated that other trigger points can be used to initiate transfer of this data, including insertion and/or removal of the battery 5 from a frame of either the charging station 3 or the vehicle 9. In yet other examples, the battery 5 may send this information in real-time or near real-time via cellular date to the communications network 12.

Centralised Server 27 as an Authentication System

Figure 7:
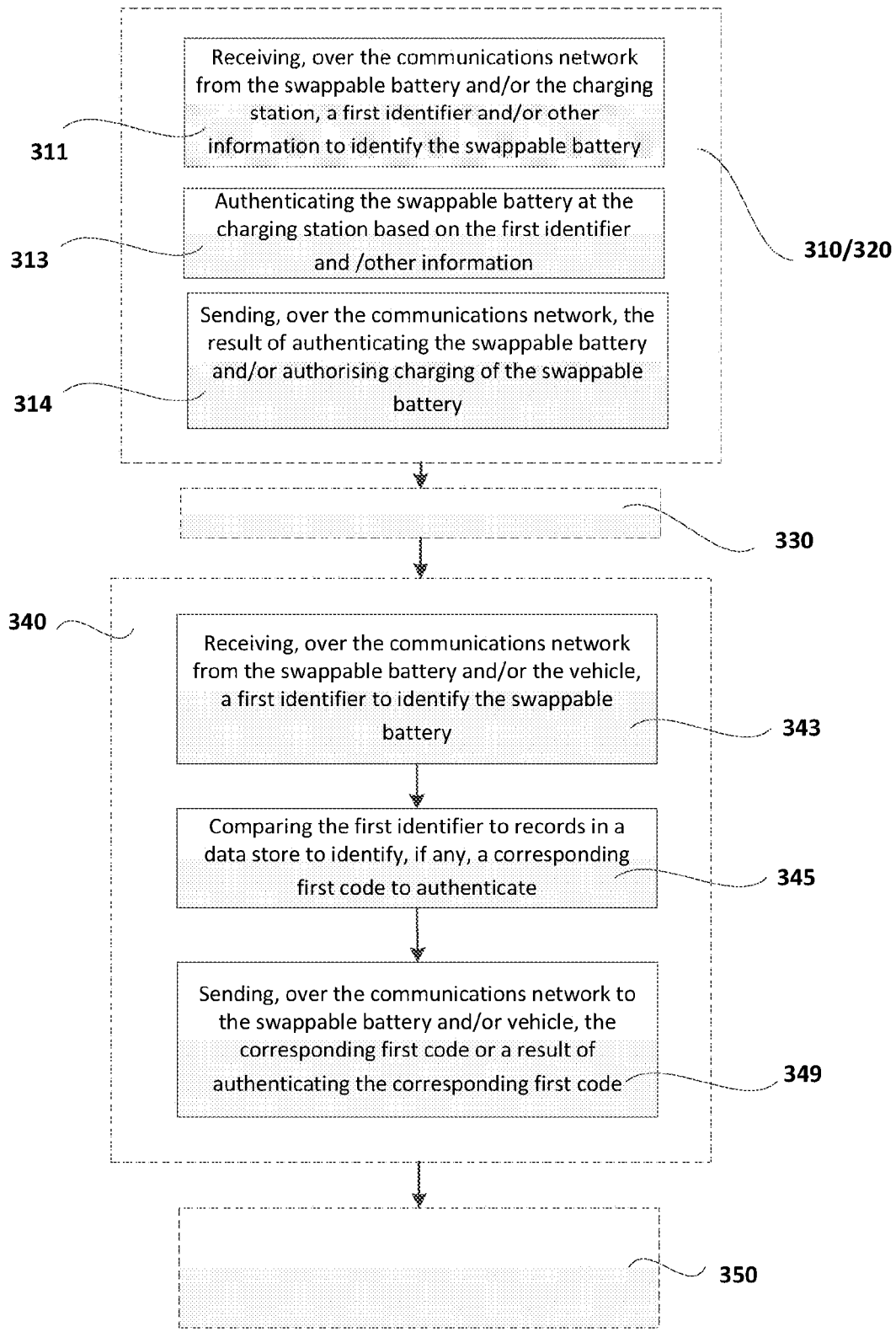
FIG. 7 is a flow diagram of yet another example of further steps of the method in FIG. 4 performed at a server.

In another example, all authentication (and associated) steps (i.e. the important decision making steps) are centralised at the server 27. That is, the charging station 3, battery 5, and/or vehicle 9 sends a request to the server 27 that performs the function and returns results of the authentication. The centralised server 27 may also receive data from the battery 5 discussed above that can be used to determine use and to update accounts of users and providers of the system. An example of the method performed at a centralised server is illustrated in FIG. 7.

The swappable battery 5 has a first identifier 111 that can be a serial number, handle that can be static or dynamic. Importantly, the first identifier 111 is used to identify the swappable battery 5. When the swappable battery 5 is received at the charging station 3, the first identifier 111 is sent by the swappable battery and/or the charging station 3 to the server 27. The first identifier 111 may be accompanied by other information, such as a time stamp and identity of the charging station 9. In yet a further example, the first identifier 111 may be signed with a digital signature of the charging station 3 to allow the server 27 to confirm that the battery 5 is received in the charging station 3. Upon receiving 311 the first identifier 111, the server authenticates the swappable battery 5 at the charging station 9 based on the first identifier 111 and other information, which may include records in relation to the battery 5 in the data store 11. In further example, authentication can include authenticating identifiers (such as cell ID) for particular cell or cells that make up the swappable battery 5. If the swappable battery 5 is authenticated, the result of the authentication (or authorisation to charge) is sent 314 to the charging station 3 and/or battery 5. At the charging station 3, this information is used to commence charging of the battery 5.

If the swappable battery 5 is charged at the charging station 3, a notification may be sent to inform the server 27 of this fact. The server 27 can then associate 330 a first code 8 with the swappable battery 5 to attest that the swappable battery was charged at the charging station. This can include the server 27 recording the first code 8 in the data store 11 (or evidence of the first code 10 in the data store). In other examples, the first code 8 can also be sent by the server 27 to other nodes.

Upon receiving the swappable battery 5 in the vehicle 9, the first identifier 111 is sent, via the communications network 12, to be received 343 at the server 27. In some examples, this can be sent by the processing devices 23, 25 of the battery 5 and/or the vehicle 9. The first identifier 111 may be accompanied by other information, such as a time stamp and vehicle information. In yet a further example, the first identifier 111 may be signed with a digital signature of the vehicle 9 to allow the server 27 to confirm that the battery 5 is received with the vehicle 9. The server 27 then compares 345 the received first identifier 111 to records in the data store 11 to identify, if any, a corresponding first code 8 to authenticate.

In some examples, the server 27 will authenticate the identified first code 8, and the (positive) result of the authentication is sent 349 to the battery 5 and/or vehicle 9. The authenticated first code can be synonymous with authorisation for the battery 5 to be used with the vehicle 9, and these devices can proceed on the basis of receiving the positive result.

In an alternative, or further example, the identified first code 8 is sent 349 to the battery 5 and/or vehicle 9, whereby these devices can use the first code 8 for at least part of the authentication step 340.

Examples of Use of a Vehicle 101 with Trailer 121 or Trailers

In some examples, topographic data and/or historical driving data can be used to affect how the vehicle 101, 102 uses the powertrain 103 and/or trailer powertrain 123. In particular, this can be used to determine advantageous situations to apply power to drive particular wheels 105, 125, or to apply regenerative braking.

Topographic data and road data can be obtained from map databases and based on this information, the vehicle master controller 107 and/or trailer controller 127 can anticipate ascents and descents along the routes, as well as speed limits, corners, stop signs, traffic lights, and areas of heavy traffic, etc. Therefore the vehicle can adjust performance at the powertrain 103, 123 accordingly. For example, before or during ascent, the vehicle can allocate resources to increase power to the wheels 105, 125. This may include, for example, providing power to drive trailer wheels 125 that may otherwise be idle (non-driven) wheels. In another example, during or in anticipation of descent the powertrain 103, 123 (and battery) can prepare for regenerative braking.

The hybrid powertrain may also contain a heat sink in the case that power needs to be dumped to the environment.

The topographic data can be supplemented, or replaced with, historical driving data on those roads. For example, outputs from the load sensors 131 can be used to determine, or vary, the amount of power or regeneration required from the powertrain 103, 123 for improved performance. It is to be appreciated that improved performance can include one or more performance indicators, such as overall energy efficiency, energy efficiency of a particular components (such prioritising saving fuel over energy in the battery 5 in a hybrid system), and/or speed/time efficiency of the vehicle to the destination.

In the example where the vehicle 101 includes a pure electric powered prime mover 102 with the trailer 121, the vehicle master controller 107 and trailer controller 127 can be selectively configured so that the loads on the powertrain 103, 123 and batteries 5, 126 are approximately the same. That is, spreading the load evenly across the components.

However, in another example, the vehicle master controller 107 and trailer controller 127 may be selectively configured to prioritise maintaining a higher state of charge on the battery 5 in the prime mover 102. In which case, the trailer powertrain 123 may take on a greater load, and/or power may be transferred from the trailer swappable battery 126 to the prime mover 102. This may be advantageous in situations where it is anticipated the prime mover 102 will arrive at an intermediate destination, after which the trailer 123 detached and/or replaced. In such case, the prime move can continue the journey with a greater range without recharging or a battery swap. It is to be appreciated the converse may be desirable depending on operator preferences.

Where the vehicle 201 includes a hybrid powertrain 203, other configurations can be advantageous. Take for example a diesel-only (or other non-battery fuel source such as gas) prime mover coupled to a trailer 121 with a trailer powertrain 123 and battery 126. In some examples, the trailer powertrain 123 is used as a supplemental system to assist the vehicle for ascents and initial starting. The trailer swappable battery 126 may be charged, in part, by the pull of the prime mover in anticipation of an ascent (i.e. the battery is indirectly charged by the prime mover). During the ascent, the trailer powertrain 123 can provide supplemental drive to the trailer wheels 125. This configuration can be desirable in situations where the battery 126 has a lower capacity or has a lower state of charge.

In yet another alternative, the hybrid powertrain 203 may be configured to prioritise use of power at the trailer 121 to reduce fuel consumption. In some examples, this includes scheduling power use such that the trailer 121 arriving at the destination or depot is depleted or substantially depleted. This may be advantageous as the trailer may be at a destination for some time, so that the trailer is concurrently charged whilst it is loaded or unloaded or a battery swap occurs Further Variations of the Vehicle and Trailer The examples illustrated in FIGS. 2 and 3 show a double trailer in a "B-train" (also known as "B-double") configuration. However, it is to be appreciated that in further examples, the present disclosure can (where practical) be applied to other truck configurations including semi-trailers, pig trailer, dog trailer, and other trucking and road train configurations. This may include "A-double", "B-triple", C-train, and other combinations and variations.

It is also to be appreciated that in some further examples, non-standard truck configurations can also use the present disclosure. For example, movement of extremely heavy loads (e.g. industrial electrical transformers and generators) may require the use of trailers moved by multiple prime movers linked to the trailer with hard bars (or other connection). Since more than one prime mover is used, to increase efficiency and coordination one of the vehicle master controllers may be selected to be the primary controller for the assembled plurality of prime mover and trailer combination. The vehicle master controller of the remaining prime movers (and, if present, trailer controllers) act as slaves to this primary controller.

The swappable battery 5, and trailer swappable battery 126 may have auxiliary uses. In some examples, this includes providing power to auxiliary devices such as lights, refrigeration, heating, cranes, or even devices in the load carried by the vehicle. In other examples, the swappable battery 5, 126 can be used as an auxiliary, mobile, or emergency power source. For example, powering equipment at a worksite or other destination.

In some examples, the trailer 121, with the trailer controller 127, is configured to power the trailer or the load of the trailer even if the trailer 121 is not attached to a prime mover 102.

In yet another example, the trailer controller 127 can be used to control the trailer powertrain 123 to allow movement of the trailer 121 without a prime mover 102. In some examples, this includes mounting the trailer 121 with a dolly for support or having trailer legs accommodating for such movements. It is to be appreciated in yet further examples, the trailer controller 127 can communicate with other controllers to facilitate automated movement of trailers 121 in a logistics yard.

Selective Output Voltages with Common Swappable Battery

The system can be configured so that the swappable battery 5 can output a desired voltage based on the requirements of that vehicle. This can include configuring the electrical circuits on the vehicle side to achieve the desired voltage. Advantageously in some examples, the same swappable battery 5 can be swapped for use in multiple different vehicles (with respective different requirements) without having to specifically configure or reconfigure the circuitry within the swappable battery 5. This reduces, or eliminates, the chance of error that the battery 5 would inadvertently supply the wrong voltage to the vehicle. In some examples, this is achieved by selective wiring of electrical circuits in the vehicle as illustrated in FIGS. 9a to 9d.

In this example of a battery system, the swappable battery 5 includes a plurality of battery modules 40 to output electrical power to a corresponding plurality of battery terminals 50. For illustrative purposes, each battery module 41, 42, 43, 44, 45, 46 has a nominal voltage of 400V. It is to be appreciated that the battery module can be different voltages depending on the number and type of battery cells contained within. In this illustrative example, each of the six battery modules 40 have a corresponding battery terminal 50 to output the approximately 400V nominal voltage of that battery module.

Figures 9A, 9B:
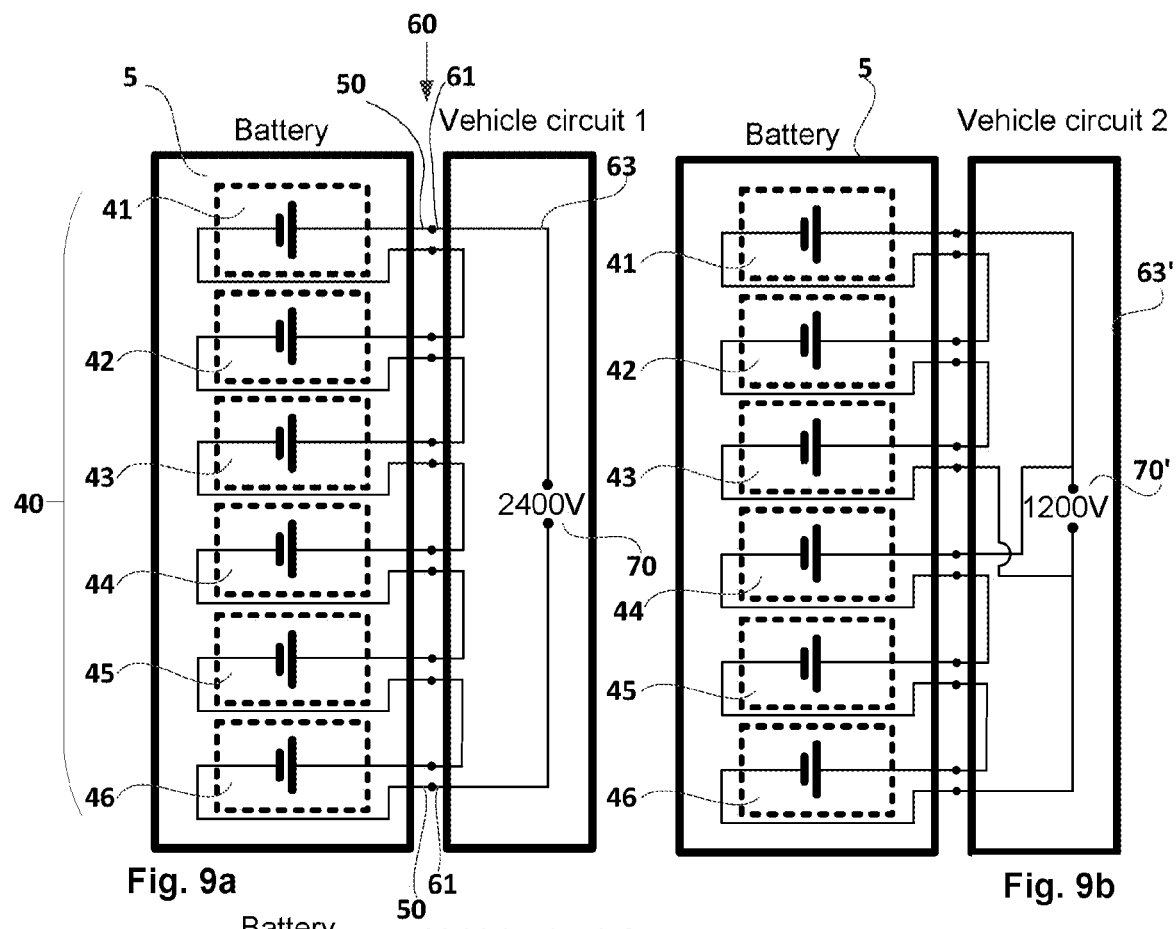
FIGS. 9a to 9d illustrate examples of a swappable battery received in different vehicles having different vehicle circuits to obtain different effective voltages.

Referring to FIG. 9a, the battery receptacle 60 includes a plurality of receptacle terminals 61 to electrically interface with the battery terminals 40. In some examples, the number of receptacle terminals 61 match the number of battery terminals 50.

An electrical circuit 63 is connected to the receptacle terminals 61 and configured to combine to power from the battery modules 40 to output a specified voltage 70. Typically, this electrical circuit 63 is provided at the battery receptacle 60 or elsewhere in the vehicle (but not the swappable battery). Referring to FIG. 9a, the electrical circuit 63 is configured such that the six battery modules 40 are in series with a combined output of 2400V.

In FIG. 9b, the electrical circuit 63' is configured so that a first set of three battery modules 41, 42, 43 are in series to provide 1200V. A second set of three battery modules 44, 45, 46 are also in series to provide 1200V. Finally, the first set and second set are combined in parallel so that the combined output 70' is 1200V.

Figures 9C, 9D:
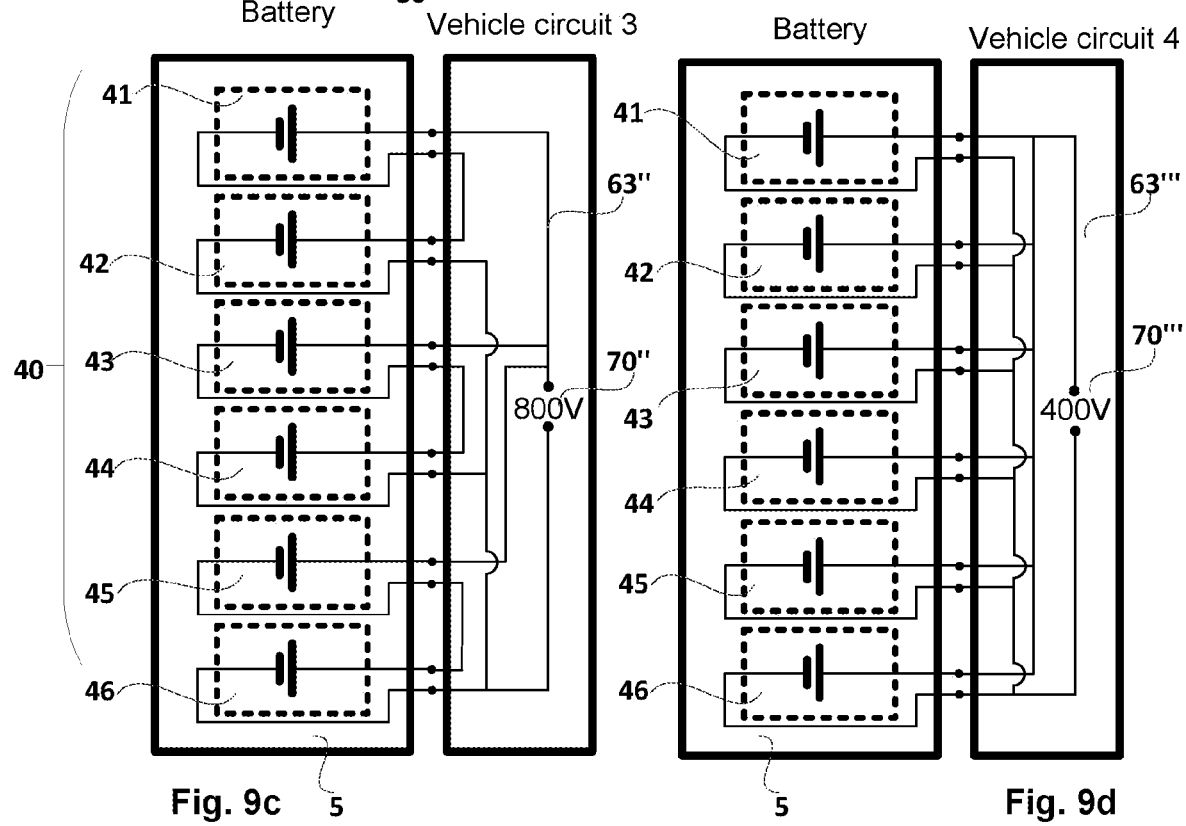

In FIG. 9c, the electrical circuit 63" is configured so that a first set of two battery modules 41, 42 are in series to provide 800V. A second set of two battery modules 43, 44 are also in series to provide 800V. A third set of two battery modules 45, 46 are also in series to provide 800V Finally, the first, second and third set are combined in parallel so that the combined output 70" is 800V.

FIG. 9d illustrates an electrical circuit 63''' where all the battery modules 41, 42, 43, 44, 45, 46 are connected in parallel to one another. This provides a combined output 70''' of 400V.

In some examples, each of the electrical circuits in 9a, 9b, 9c, and 9d represent the electrical circuits 63 of different vehicles, but where the same common battery type can be used in any of the vehicles. For example, a first vehicle with a high voltage requirement may be hard wired with the electrical circuit illustrated in FIG. 9a. so that the highest voltages can be obtained from the battery. A second vehicle, where the voltage requirement is lower (for example a smaller vehicle with a smaller motor and expected load) may be wired with the electrical circuit in FIG. 9d as 400V may be sufficient for the expected use of that vehicle. An advantage is it allows the use of the same type of swappable battery 5 and common configuration of receptacle terminals 61 at the battery receptacle 60. This assists in easy management as swappable batteries can be shared amongst different vehicle types whilst lowering the risk that the wrong voltage would be supplied to the vehicle. It also allows vehicle manufactures to flexibility to selected the voltages required from the swappable battery 5.

Battery Receptacle Subframe

During operation of the vehicle, the load and road conditions can cause the chassis of the vehicle distort and twist. In conventional internal combustion engines, the fuel is usually in a liquid (or gaseous) form and small movements and distortions to a fuel tank is inconsequential as the fuel can easily displace inside the fuel tank. However in electric batteries, where components include solid components, such movements and distortions may have adverse effects. Therefore in some examples, the battery receptacle is configured to isolate, reduce, or eliminate, transmission of torsional forces on the chassis 90 towards the battery 5.

Figure 10:
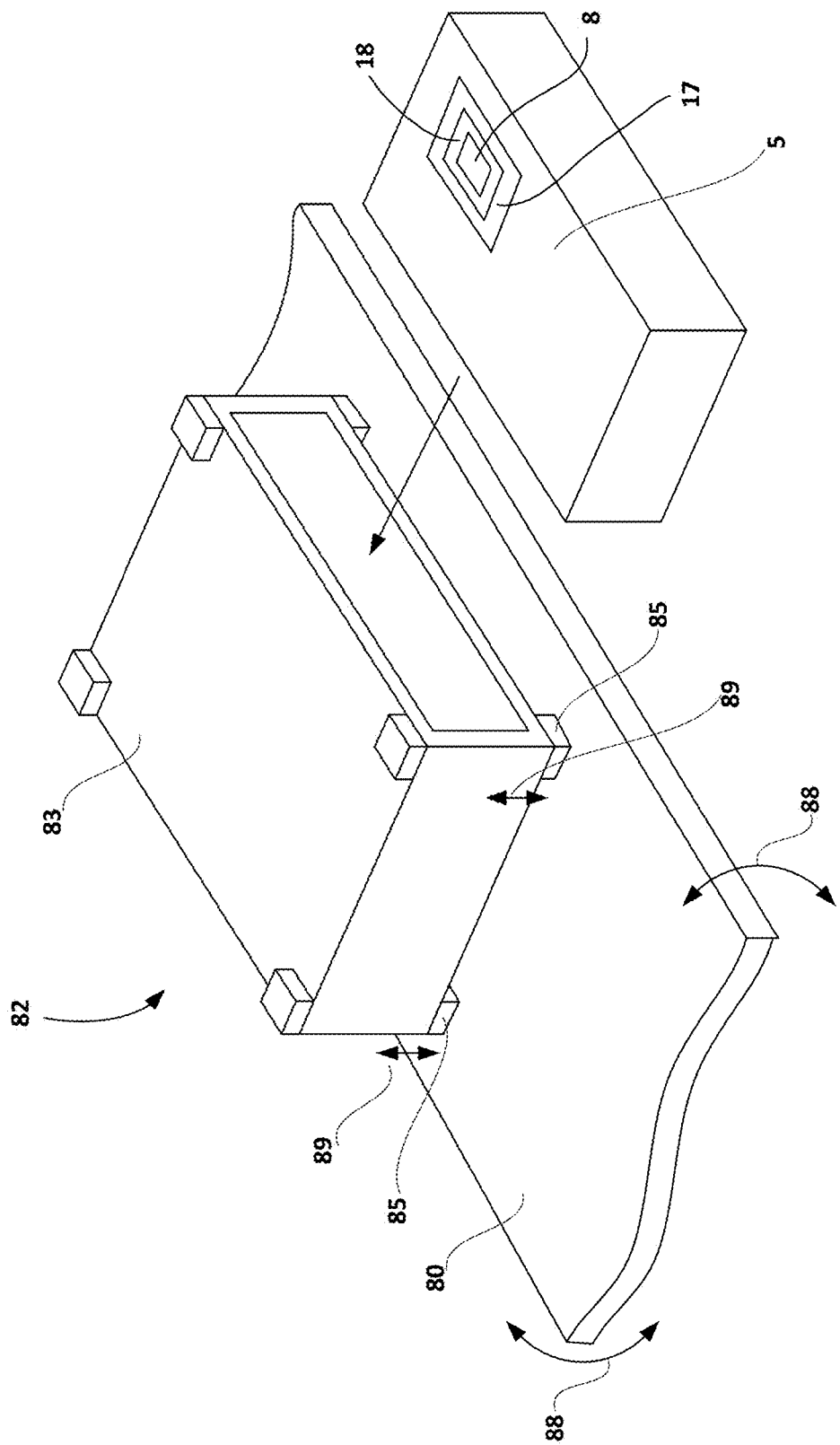
FIG. 10 is an example of a battery receptacle, in the form of a subframe, mounted to the truck or trailer chassis, whereby the mounting between the subframe and the chassis permits limited relative movement.

FIG. 10 illustrates an example of a battery receptacle subframe 82 mounted to the chassis 80, wherein the battery receptacle subframe includes at least one rigid portion 83 to support a battery 5 received therein. The battery receptacle subframe 82 also includes a flexible and/or resilient portion 85. In this particular example, the resilient portion 85 is between the rigid portion 83 and the chassis 80. When torsional forces 88 occur against the chassis 80, such distortions on the chassis 80 can be absorbed by the flexible/and or resilient portions 85 by movement 89. In some examples, the flexible and/or resilient portions can be bushings, such as those made of rubber or other elastomeric material. Other examples can include springs, pneumatic systems, etc.

The rigid portion 83 of the subframe 82 can be structured to provide additional rigidity and support to the battery 5. This can include a structure to resist bending forces from the chassis acting on the battery 5. In other examples, an flexible/resilient element(s) are provided between the rigid portion 83 and the battery 5 to reduce forces acting on the battery 5.

Figure 11:
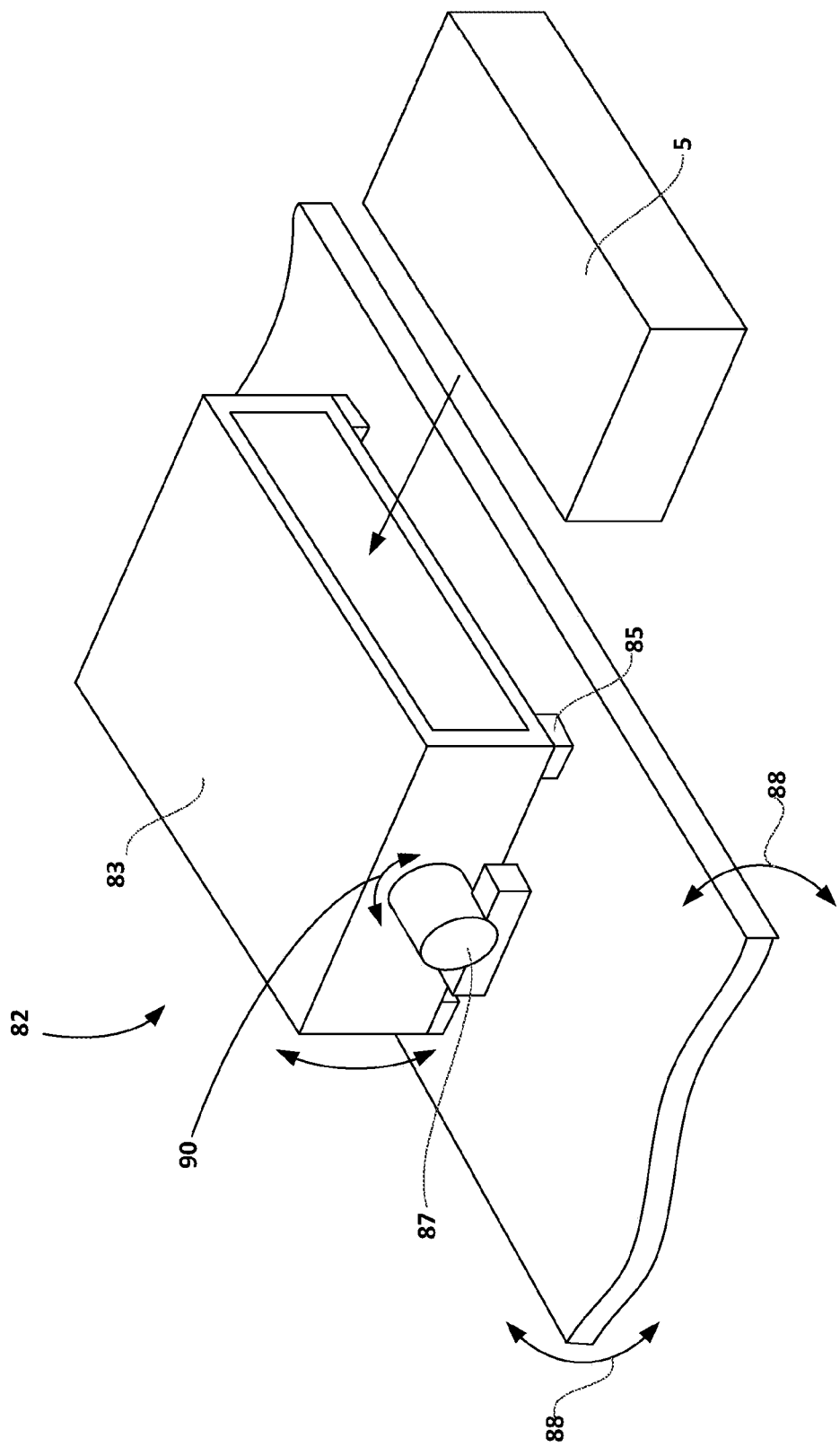
FIG. 11 is another example of a battery receptacle mounted to the truck or trailer chassis.

FIG. 11 illustrates another example of a battery receptacle subframe 82 mounted to the chassis 80. In this example, the battery receptacle subframe 82 is flexibly mounted to the chassis with a pivot 87. In this example, the pivot 87 is substantially along the longitudinal axis of the chassis 80 that is close to the centre of the expected torsional forces 88. Therefore when the chassis 80 is subject to torsional forces, the rigid portion 83 of the subframe 82 may rotate 90 relative to parts of the chassis 80 to isolate, minimise, or eliminate, distorting forces acting against the battery 5.

In further examples, combinations of the above elements can be used, including a resilient portion 85 between the chassis 80 and subframe 82 in addition to the pivot 87 as illustrated in FIG. 11. It is to be appreciated that the chassis 80 can be the chassis of a prime mover and/or trailer.

Battery Loading

Figure 12:
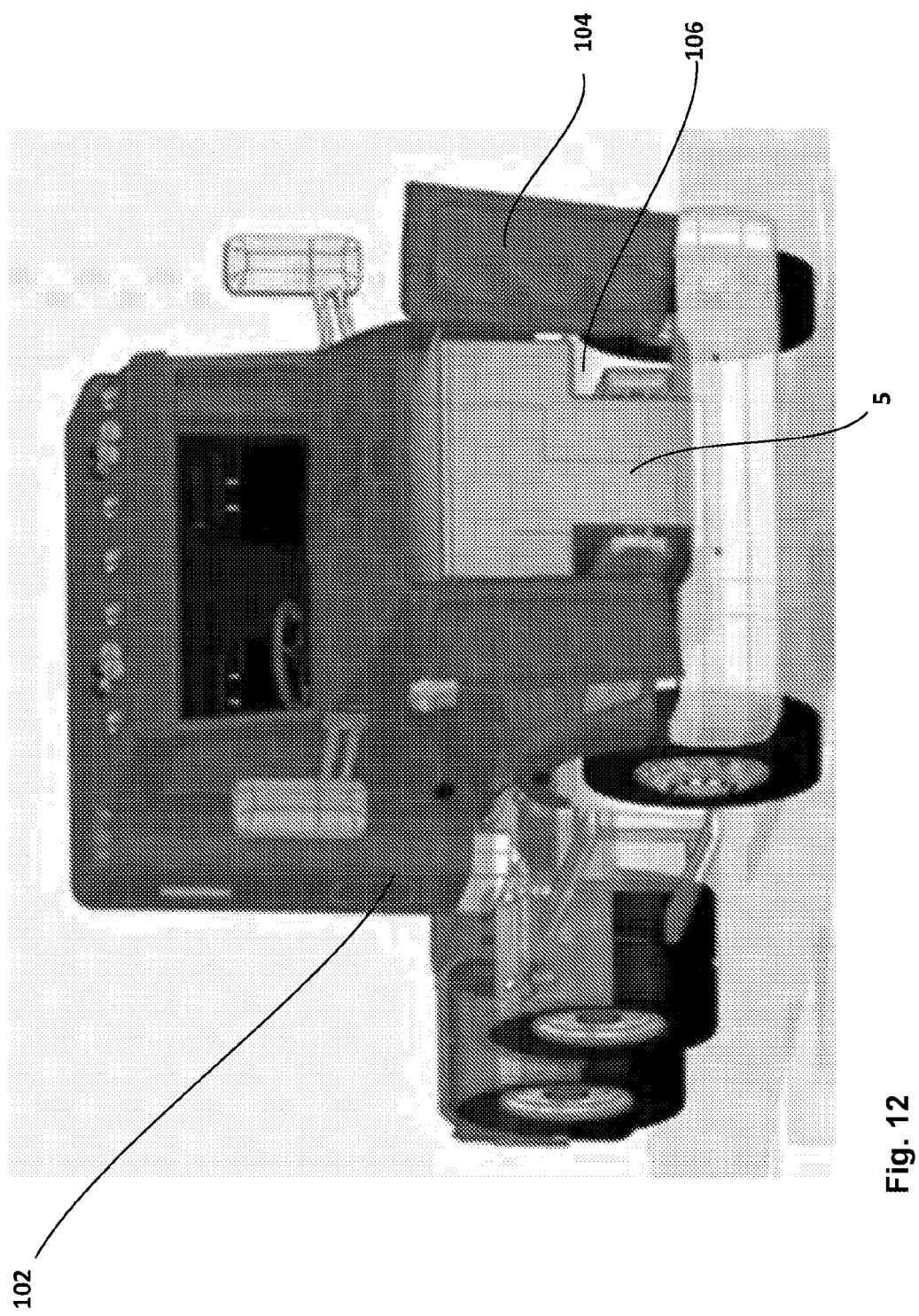
FIG. 12 is a view of a prime mover vehicle with a swappable battery.

An example of loading a swappable battery 5 is illustrated in FIG. 12. In this example, the vehicle (shown as prime mover 102), has front doors 104 to provide and opening leading into at battery compartment 106 with a battery receptacle. This allows the swappable battery 5 to be inserted and removed from the front of the vehicle. This can be advantageous over alternative configurations (such as inserting and removing toward the rear of the vehicle) as the battery 5 can be swapped while a trailer 121 is attached to the rear. This configuration may be advantageous over side loading configurations where the wheels can interfere with insertion and extraction (or otherwise dictate a less optimal form factor for the battery).

Referring to FIG. 2, the trailer 121 may have swappable batteries 126 that are inserted and extracted from the side of the vehicle 101. This may be advantageous to avoid interference from the prime mover 102 at the front and the trailer wheels at the rear. In yet further examples, the swappable batteries 126 may be inserted and extracted downwards from the trailer 121 (i.e. below the trailer 121). In yet further examples, this can be a combination of downwards and sideways.

Variations of Authenticating the Battery Using Cell Characteristics

In some examples, the characteristics of a cell of a battery, or characteristics of the battery 5 as a whole can be used to authenticate the swappable battery 5. Battery cells are generally mass-produced and are ideally manufactured to be consistent with other cells. For example, battery chemistry, configurations, etc. are designed to specified voltages, capacity, resistance and other impedance characteristics, etc. However in practice, the cells (and the battery made up of cells) have variances in such characteristics. Such variances can be used like fingerprints to assist in identification of a cell, which in turn can be used as part of the authentication process for the battery 5.

In some examples, the cell characteristics have sufficient unique characteristics to allow identification of the battery (against a record of characteristic of a plurality of batteries) based only on the cell characteristics.

It is to be appreciated that the cell characteristics, in some examples, are not sufficiently precise, or unique, in itself for identification. Thus in some examples the cell characteristics are used to determine a confidence or probability that the cell, or battery, is in fact the battery 5 corresponding to the asserted battery (or corresponding a respective first identifier 111 or cell identifier(s)). Thus the cell characteristics is used, at least in part, for the authentication process to confirm that the battery is the asserted battery. This may be used in conjunction with the other authentication methods described herein.

As a illustrative example, "Battery 0A" is known to have a voltage range of 395 to 401 volts. This characteristic of Battery 0A is stored in the data store 11 (which may also include storing in encrypted form on the distributed ledger 13). During the process of authenticating the swappable battery 5, one or more voltage measurements of the battery 5 (or sensor data that can be used to derive the voltage of the battery 5) are sent to the authentication system 7. The authentication system 7 can then compare the voltage measurements of the battery with the stored characteristics of the Battery 0A, and if the measurements fall within the stored characteristics, this can be used to assist in confirming authentication of that battery. Similar comparisons can be done for other characteristics such as resistance, other impedance characteristics, etc.

The characteristics of a particular cell and battery can vary throughout the operational life of the battery and even within a charge and discharge cycle. Factors that can influence the characteristics can include:

Age of the battery;
Number of battery cycles;
Charge and discharge rates; and
Temperature, including environmental temperature(s), charging temperature(s), discharge temperature(s), storage temperature(s).

Thus in some examples, parameters can be applied to the stored characteristics of the battery to account for the above mentioned factors. In other examples, measurements of battery characteristics are sent to the authentication system 7 to update the stored characteristics for that battery. This can include sending such information routinely when the swappable battery 5 is charged at a charging station 3.

In yet further examples, nodes of the network (such as the charging station, vehicles, or even the swappable battery) monitor the battery or cell characteristics during charging, storage, and use, to provide the training data and to continuously update the model.

In other examples, machine learning can be applied to build a model for the cell or batteries. This can include building the model with training data from the specific cell or battery only, or with training data that includes other cells and batteries in the network.

In some examples, machine learning (or other forms of artificial intelligence) models are applied to output a result or probability that the swappable battery is authenticated as the asserted battery.

Processing Device

The charger authentication processing device 21, battery authentication processing device 23, vehicle authentication processing device 25, server processing device 29, vehicle master controller 107, and trailer controller 127 can be nodes, or associated with nodes, in a network. The nodes can be associated with an electronic device, such as a computer, tablet computer, mobile communication device, computer server, computer terminal, etc. The electronic device and nodes may also be associated with a data store 11, 18 and a user interface. Examples of a user interface include a keyboard, mouse, monitor, touchscreen display, etc. The peer-to-peer distributed ledger 13 may also be associated with multiple processing devices.

Figure 8:
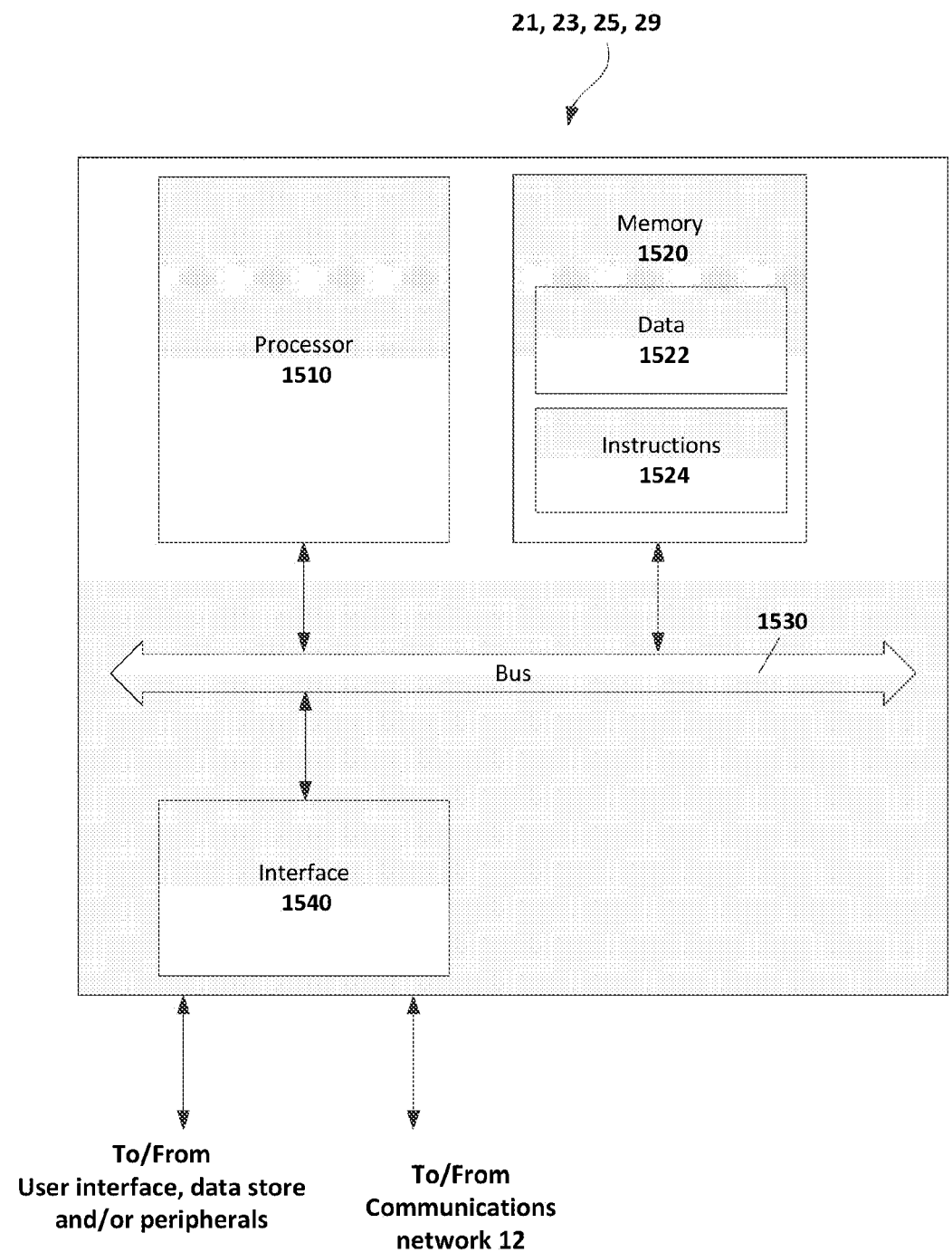
FIG. 8 is a schematic diagram of a processing device.

FIG. 8 illustrates an example of a processing device 21, 23, 25, 29, 107, 127. The processing device includes a processor 1510, a memory 1520 and an interface device 1540 that communicate with each other via a bus 1530. The memory 1520 stores instructions and data for implementing the method 300 described above, and the processor 1510 performs the instructions (such as a computer program) from the memory 1520 to implement the methods 300. The interface device 1540 may include a communications module that facilitates communication with the communications network 12 and, in some examples, with the user interface and peripherals such as data store 11. It should be noted that although the processing device 1510 may be independent network elements, the processing device 1510 may also be part of another network element. Further, some functions performed by the processing device may be distributed between multiple network elements.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A battery network management system for swappable batteries used in vehicles, the system comprising:
   at least one swappable battery configured to discharge electrical power to drive a vehicle;
   a charging station configured to receive the swappable battery, wherein the charging station is configured to charge the swappable battery in a first condition, in which the swappable battery is authenticated by an authentication system; and
   a first code configured to attest the swappable battery was charged in the charging station based on the first condition,
   wherein, after charging the swappable battery in the charging station, the at least one swappable battery is configured to be received into the vehicle to discharges the electrical power to drive the vehicle based on a second condition in which:
   the swappable battery that is authenticated by the authentication system is received in the vehicle; and
   the authentication system authenticates the first code,
   wherein the swappable battery is configured to be separated from the vehicle when the swappable battery is charged in the charging station in the first condition,
   wherein authenticating the first code is based, at least in part, on receiving from the swappable battery in the vehicle:
   a first representation of the first code; and/or
   a first identifier to identify the swappable battery to the first code.

2. The battery network management system according to claim 1 further comprising the authentication system with an associated data store,
   wherein the authentication system stores first evidence of the first code in the data store, and
   wherein the authentication system authenticates the first code based on the first evidence in the data store.

3. The battery network management system according to claim 2 wherein the first evidence is the first code.

4. The battery network management system according to claim 2, wherein the swappable battery is associated with a battery data store, and wherein the first representation of the first code is stored in the battery data store, and wherein the authentication system authenticates the first code by comparing the first representation stored in the battery data store with the first evidence stored in the data store.

5. The battery network management system according to claim 2, wherein to authenticate the swappable battery by the authentication system includes: authenticating identifier (s) associated with the swappable battery, or identifier(s) associated with cells in the battery, against corresponding records, stored in the data store, of identifiers associated with the swappable battery.

6. The battery network management system according to claim 1, wherein to authenticate the swappable battery by the authentication system includes: receiving one or more cell or battery characteristics; and comparing the one or more cell or battery characteristics against corresponding records of cell or battery characteristics of the swappable battery.

7. The battery network management system according to claim 1, wherein the authentication system comprises:
   a charger authentication processing device associated with the charging station to:
   authenticate the swappable battery; and/or
   associate the first code with the swappable battery.

8. The battery network management system according to claim 1, wherein the authentication system comprises:
   a battery authentication processing device associated with the swappable battery to:
   authenticate the swappable battery; and/or
   associate the first code with the swappable battery; and/or
   authenticate the vehicle that received the swappable battery; and/or
   authenticate the first code; and/or
   authenticate the charging station that received the swappable battery.

9. The battery network management system according to claim 1, wherein the authentication system comprises:

a vehicle authentication processing device associated with the vehicle to:
  authenticate the vehicle; and/or
  authenticate the swappable battery received in the vehicle; and/or
  authenticate the first code of the swappable battery received in the vehicle.

10. The battery network management system according to claim 1, wherein the authentication system comprises:
a server, with a server processing device to:
  authenticate the swappable battery received at the charging station; and/or
  authorise the charging station to charge the swappable battery;
  associate the first code with the swappable battery; and/or
  authenticate the swappable battery received in the vehicle; and/or
  authenticate the vehicle that received the swappable battery; and/or
  authenticate the first code of the swappable battery received in the vehicle; and/or
  authenticate the charging station; and/or
  authenticate the swappable battery; and/or
  authenticate the vehicle.

11. A vehicle configured to receive at least one swappable battery, comprising:
a powertrain to drive wheels of the vehicle, wherein in a first mode the at least one swappable battery is configured to discharges electrical power to the powertrain;
a vehicle master controller configured to:
  determine the at least one swappable battery is received in the vehicle, and confirm a receipt of (i) a first representation of a first code from the at least one swappable battery and/or (ii) a first identifier to identify the swappable battery to the first code from the at least one swappable battery, wherein the first code is associated with the swappable battery to attest the swappable battery was charged by an authorised charging station; and
  verify the swappable battery received in the vehicle is authorised to transfer power to the vehicle, wherein the verification is based, at least in part, on the first representation and/or the first identifier to confirm the stored energy in the received swappable battery was charged from the authorised charging station,
wherein the first mode is conditional on the vehicle master controller verifying the swappable battery,
wherein the at least one swappable battery is configured to be separated from the vehicle when the swappable battery is charged in the charging station.

12. The vehicle according to claim 11 wherein the vehicle master controller is further configured to:
receive, from a data store or a server, first evidence of the first code, wherein the first evidence is a record of the authorised charging station charging the swappable battery,
wherein to verify the swappable battery includes confirming the first representation corresponds to the first evidence.

13. The vehicle according to claim 11 wherein the vehicle master controller is further configured to:
send, to a server, the first representation, wherein the server receives first evidence of the first code from a data store, wherein the first evidence is a record of the authorised charging station charging the swappable battery, and
receive, from the server, a result of a comparison of the first representation and the first evidence,
wherein to verify the swappable battery is based on the result of the comparison.

14. The vehicle according to claim 11 wherein the vehicle master controller is further configured to:
send, to a server, the first identifier; and
receive, from the server, a result of a comparison of the first identifier to records in a data store, wherein records in the data store is evidence to attest the swappable battery was charged by the authorised charging station,
wherein to verify the swappable battery is based on the result of the comparison.

15. The vehicle according to claim 11, wherein the vehicle comprises a prime mover and the powertrain is an electric powertrain, and wherein the vehicle further comprise at least one trailer, wherein the trailer comprises:
a trailer powertrain to drive trailer wheels, wherein in the first mode the trailer powertrain draws power from the swappable battery, and/or a trailer swappable battery,
a trailer controller to:
  verify the swappable battery, and/or trailer swappable battery, is authorised to transfer power to the vehicle, wherein the authorisation includes confirmation the stored energy in the swappable battery, and/or trailer swappable battery, was charged from the authorised charging station,
wherein the first mode is also conditional on the trailer controller verifying the swappable battery, and/or trailer swappable battery.

16. A method of authenticating a swappable battery for charging and discharging in a battery network management system, the method comprising:
authenticating, by an authentication system, a swappable battery received at a charging station;
based on a result of authenticating the swappable battery, authorising charging the swappable battery received at the charging station;
associating a first code with the swappable battery to attest the swappable battery was authorised and charged at the charging station, wherein, subsequent to the authorised charging of the swappable battery at the charging station, the swappable battery is removed from the charging station and received into a vehicle;
receiving, from the swappable battery, a first representation of the first code and/or a first identifier to identify the swappable battery to the first code;
authenticating, by the authentication system, both of:
  (i) the vehicle that receives the swappable battery; and
  (ii) the first code of the swappable battery to confirm that the swappable battery was charged at the authorised charging station, wherein authenticating the first code is based, at least in part, on the first representation and/or the first identifier; and
based on a result of authenticating the vehicle and the first code, authorising discharging electrical power to drive the vehicle,
wherein the swappable battery is separated from the vehicle when the swappable battery is charged in the charging station.

17. The method according to claim 16, wherein the method further comprises:
authenticating, by the authentication system, the charging station that receives the swappable battery,
wherein charging the swappable battery is conditional on a result of authentication of the charging station.

18. The method according to claim 16, wherein the method further comprises:
- storing first evidence of the first code in a data store,
- wherein authenticating the first code of the swappable battery is based on querying the first evidence in the data store, and wherein the data store comprises a distributed ledger, and the step of storing first evidence comprises writing to the distributed ledger.

19. The method according to claim 18, wherein the method further comprises:
- storing, in a battery data store, a first representation of the first code, and wherein the step of authenticating the first code comprises:
- comparing the first representation stored in the battery data store with the first evidence stored in the data store.

20. The method according to claim 19, wherein the authentication system comprises a server, wherein the server is in communication over a communications network with at least one of the charging station, the swappable battery, and the vehicle and configured to perform at least one of the steps in the method, wherein authenticating the first code comprises:
- receiving, over the communication network from the swappable battery and/or the vehicle, the first representation of the first code;
- receiving, from the data store, the first evidence;
- sending, over the communication network to the swappable battery and/or vehicle, a result of comparing the first representation with the first evidence.

* * * * *